United States Patent [19]

Lafortune et al.

[11] Patent Number: 5,310,315
[45] Date of Patent: May 10, 1994

[54] LOW-VULNERABILITY DEVICE FOR THE CONTROL OF HELICOPTER ROTOR BY CYCLIC PLATES

[75] Inventors: Alain G. Lafortune, Vitrolles; Francois Potdevin, Ventabren, both of France

[73] Assignee: Aerospatiale Societe Nationale Industrielle, Paris, France

[21] Appl. No.: 985,081

[22] Filed: Dec. 3, 1992

[30] Foreign Application Priority Data

Dec. 11, 1991 [FR] France .................. 91 15388

[51] Int. Cl.⁵ .................................. B64C 27/64
[52] U.S. Cl. ........................... 416/114; 60/403; 91/216 A; 91/510; 91/523; 91/438; 91/358 A
[58] Field of Search ............. 416/114, 162; 60/403; 91/216 R, 216 A, 358 A, 374, 384, 509, 510, 521, 522, 523, 438, 448

[56] References Cited

U.S. PATENT DOCUMENTS

| | | | |
|---|---|---|---|
| 3,256,780 | 6/1966 | Riley et al. | 91/216 R |
| 3,295,420 | 1/1967 | Gleason | 91/509 |
| 3,640,185 | 2/1972 | Korsak | 91/509 |
| 4,192,218 | 3/1980 | Yamamoto | 91/216 A |
| 4,413,547 | 11/1983 | Devaud | 91/384 |
| 4,414,881 | 11/1983 | Devaud | 91/216 R |

FOREIGN PATENT DOCUMENTS

| | | |
|---|---|---|
| 0068728 | 1/1983 | European Pat. Off. . |
| 2050018 | 1/1980 | Fed. Rep. of Germany ...... 416/162 |
| 2032374 | 5/1980 | United Kingdom . |

Primary Examiner—Edward K. Look
Assistant Examiner—James A. Larson
Attorney, Agent, or Firm—Nikaido Marmelstein Murray & Oram

[57] ABSTRACT

The invention relates to a low-vulnerability device for the operation of a lifting and propulsing helicopter rotor by means of a cyclic plate mechanism, in which the non-rotating plate (5) is coupled at four points (1, 2, 3, 4) to four hydraulic actioning servocontrols each comprising a power jack (9), an anchoring system (10) and a servocontrol-distributor (41, 42), three servocontrols being used when normally working, the fourth being used in back-up in the event of a failure of one of the other three. Each power jack (9) is supplied by an independent hydraulic circuit which comprises the servocontrol-distributor (41, 42) operated by a mechanical input, connected to the cockpit by linkage (13), and a disengageable anchoring system. The mechanical inputs each comprise a system which, above a force threshold on a normally active servocontrol-distributor, neutralizes the servocontrol-distributor concerned, which initiates the starting up of the normally inactive servocontrol-distributor which then becomes operational in safeguard mode.

39 Claims, 9 Drawing Sheets

LOW-VULNERABILITY DEVICE FOR THE CONTROL OF HELICOPTER ROTOR BY CYCLIC PLATES

This invention relates to a low-vulnerability system for controlling a helicopter rotor by cyclic plates. More precisely, the object of this invention is a device for controlling the cyclic plate of a helicopter by hydraulic servocontrols which, in the event of a servocontrol rupturing or becoming disabled, will not compromise the safety of the aircraft. This particular arrangement of main rotor control servocontrols and associated control functions is therefore intended to allow the pilot to maintain control of the aircraft in the event of one of the servocontrols becoming seriously damaged by a projectile.

Military helicopters are particularly exposed in enemy zones, and can be damaged or neutralized by the destruction of one of the cyclic plate control channels. Because of this risk, military specifications require that control of the cyclic plate can continue normally in the event of one of the control channels becoming damaged.

Many systems have been proposed, all of which are based on the principle of control unit redundancy which allows the back-up control system to take over and operate in place of the failed control unit.

French patent FR-2 438 586 refers to this type of redundant control device for helicopter rotor oscillating plates. The cyclic plate control device described in this patent comprises at least four actuator units, five being shown in the assembly shown in the attached drawings. Each actuator unit consists of an electrical generator and a hydraulic pump associated with a hydraulic drive jack, to form an autonomous unit. Only three actuator units are used at any one time, the others being considered as passive back-up units and which only become active in the event of a failure of any one of the first three, essentially as a result of a ballistic impact.

This patent therefore employs the well-known principle of controlling the cyclic plate by a system comprising at least four servocontrols, of which at least three are used in normal working, with the other or others being used automatically in back-up mode in the event of a failure of any one of the first three. The device defined in this document employs, for each actuator unit, an electrical generator which works with a hydraulic jack and a hydraulic pump. This assembly is relatively complex and bulky, whether it be in terms of each servocontrol, their anchoring or the disengagement operation. Moreover, each actuator unit requires an electrical generator with its own circuit.

The object of this invention is to remedy the different drawbacks mentioned above, and to propose a low-vulnerability device for controlling the cyclic plates of a helicopter rotor, possessing a back-up system which automatically intervenes in the even of an anomaly appearing on an actuator unit, in such a way so as to not require detection or intervention by the pilot, the pilot simply being informed as to what is being done, this device being as compact as possible so as to be robust and reliable.

The low-vulnerability system, in accordance with the invention, relates to the operation of a helicopter lift and propulsion rotor by means of a cyclic plate mechanism mounted coaxially on the rotor drive shaft. This cyclic plate mechanism comprises a rotating plate and a non-rotating plate, with the rotating plate coupled by its peripheral part individually to a rod for controlling the pitch of each rotor blade, and the non-rotating plate coupled at four points regularly distributed around its periphery to four hydraulic actuating servocontrols. Each hydraulic actuating servocontrol comprises a power jack, an anchoring system and a servocontrol-distributor, with three of the servocontrols used in normal working and the fourth used as back-up in the event of a failure on the other three. Each power jack is supplied by a hydraulic circuit, independent of the hydraulic circuits of the other jacks, and comprises the servocontrol-distributor operated by a mechanical input which is linked to the cockpit by control linkage. Each power jack comprises a disengageable anchoring system. Three of the servocontrol-distributors are structurally arranged so as to be active in normal working and to lack the anchoring system of each corresponding jack, and one servocontrol-distributor is structurally arranged so as to be passive in normal working and to keep the anchoring system of the corresponding power jack disengaged. Each mechanical input of these four servocontrol-distributors comprises a system which in the event of a certain force threshold being exceeded on one of the three normally active servocontrol-distributors, neutralizes this servocontrol-distributor and initiates the starting up of the normally inactive servocontrol-distributor which then becomes operational in the safeguard working mode.

To provide particularly compact servocontrols, each servocontrol-distributor is incorporated in the corresponding power jack so as to form a monoblock assembly which includes the body of the servocontrol-distributor and the body of the power jack.

In each monoblock assembly, each servocontrol-distributor comprises:

a distribution assembly with a control loop between the position of the body of the power jack and the position of the corresponding mechanical input;

a system for switching this control loop so as to place it in the opposite state to that corresponding to normal working of the cyclic plate control system.

Advantageously, the control loop receives feedback information concerning the position of the body of the power jack, which acts directly on the position of the mechanical input mounted on the monoblock assembly by a control system linked to the mechanical input. This monoblock assembly is arranged in such a way so that any change in the position of the mechanical input in relation to the monoblock assembly in response to a pilot manoeuver causes displacement of the power jack body, i.e. displacement of the monoblock assembly until the mechanical input of the monoblock assembly returns to its initial relative position in relation to this monoblock assembly. The control loop is linked to the supply pressure of the corresponding independent hydraulic circuit, and the control system is connected to the fluid reservoir of this independent circuit. This control system comprises an actuator valve linked to the mechanical input.

In accordance with the arrangement of the invention, each power jack has a differential section, and comprises a piston with a rod linked to the anchoring system, in such a way as to provide an upper chamber and a lower chamber on the side of the rod and which are connected to the corresponding control loop. In this way, when the power jack operates, the lower chamber is always connected to the pressurized hydraulic circuit.

The control loop switching system preferably comprises:

a by-pass valve of the power jack which is mounted in the control loop;

a two-position switching piston;

a switching distributor which acts on the switching piston to provide two positions:

an initial position in which the switching piston works with the by-pass valve to obtain normal working of the corresponding power jack's servocontrol-distributor;

a back-up position in which the switching piston works with the by-pass valve to obtain safeguard working of the corresponding power jack servocontrol-distributor.

The by-pass valve is mounted on the supply channel of the control loop, and is connected to the fluid reservoir in such a way that this by-pass valve has at least two positions:

one position corresponding to the control loop without pressure, one working position of the servocontrol-distributor corresponding to the control loop under pressure.

In addition, the switching piston is locked in the back-up position by a switching piston lock.

To be compatible with the structure of the servocontrol described above, the mechanical input has a lock which is carried by the by-pass valve. In addition, the actuator valve and the switching distributor belong to the same part, i.e. the actuator lever linked to the mechanical input made up of an input lever. The input lever is mounted under the body of the servocontrol-distributor and is attached at one of its ends by an articulation, the other end receiving the input movement via the corresponding system. The actuator lever is linked to the input lever by an articulation located between the movement input and the articulation of the input lever assembly. The input lever works with two end stops, one upper and one lower, which are integral with the body of the servocontrol-distributor. Finally, the input lever has a recessed hole made in the upper side of the mounting articulation, this recessed hole receiving the lock piece carried by the by-pass valve which locks the input lever. More precisely, this recessed hole and lock piece have conjugate shapes in the form of a substantially truncated cone. The input lever's mounting articulation is supported by two lugs made under the body of the servocontrol-distributor.

For the device of the invention to operate correctly, the actuator lever comprises an elastic return system at the end opposite the input lever. In a first construction method, this elastic return system takes the form of a compression spring mounted between the body of the servocontrol-distributor and the end of the actuator lever. In a second construction method, the elastic return spring takes the form of a compression spring mounted on a rod of the actuator lever between two washers arranged at each of its ends and held in position by a collar, one washer pressing against a bearing face on the body of the servocontrol-distributor, and the other against another bearing face on this body.

Finally, the actuator lever comprises a damper which becomes effective after a certain distance of travel of the actuator lever in order to stop it from reaching its end positions in the event of a rapid manoeuver.

In accordance with a preferred embodiment of the invention, the three normally working active servocontrol-distributors each comprise:

an actuator valve mounted on the actuator lever, surrounded by an annular actuator chamber with a lower actuator chamber and an upper actuator chamber located each side of the actuator valve;

a by-pass valve with a by-pass rod fitted with a by-pass valve spring arranged in a chamber, the spring pushing against this valve at one end and against the switching piston on the other end, the other end of the by-pass valve having a chamferred edge which, under the action of the valve spring, comes into contact with the body, a by-pass valve annular chamber being arranged around this by-pass valve and which has a drain channel leading into the chamber;

the control loop has a first channel which connects the power jack upper chamber to the by-pass valve annular chamber which is itself connected by second channel to the annular actuator chamber of the actuator valve, and a third channel connecting the power jack lower chamber to the by-pass valve which is connected by a fourth channel to the lower actuator chamber of the actuator valve;

a first main hydraulic supply channel is connected to the supply of the hydraulic circuit and to the second main hydraulic supply channel which leads to the by-pass valve;

a main hydraulic return channel is connected to the return to the fluid reservoir leading to the upper actuator chamber of the actuator valve, the upper actuator chamber being linked by a by-pass return channel to the by-pass valve chamber of the by-pass valve; in such a way that, when the hydraulic circuit is under pressure, the by-pass valve moves as a result of the pressure in the third and fourth channels to connect the power jack lower chamber to the lower actuator chamber of the actuator valve via corresponding channels, which are thus connected to the pressurized supply channels, and in that, in response to movement of the actuator lever, the actuator valve moves so as to connect the power jack upper chamber with either the lower actuator chamber or with the upper actuator chamber of the actuator valve depending on the direction in which the lever is moved, causing the body of the jack to move until the actuator valve returns to the balancing position.

The three normally working active servocontrol-distributors each comprise:

a switching valve mounted on the actuator lever, with a lower switching chamber and an upper switching chamber located each side of the switching valve;

a switching piston mounted in the body and in the continuation of the by-pass valve, in such a way that the by-pass valve spring bears against this piston;

a system of channels connecting the bottom of the switching piston to the lower switching chamber and upper switching chamber as well as to the hydraulic supply; in such a way that, when the actuator lever moves upwards or downwards by a value greater than the permitted value, one of the actuator valve chambers is connected to the supply causing fluid to pass via the corresponding channel to the switching piston which then moves to the back-up position and pushes back the by-pass valve which then connects the chambers of the power jack to the return to the fluid reservoir via the corresponding system of channels.

Moreover, a link channel provided with a throttling passage connects the return channel to the fluid reservoir and the switching valve supply channel. To further improve the switching operation, the end of the switching piston comprises a bevelled shoulder forming an end chamber. A switching piston lock is mounted perpendicular to the axis of the switching piston which, under the action of a spring, engages in a slot made in the switching piston.

Finally, each normally working active servocontrol-distributor comprises a damper valve which is mounted on the actuator lever with a collar separating a lower damper chamber from an upper damper chamber, both of these chambers being connected to the supply channel via a system of channels, with the collar having at least one throttling passage linking the two chambers.

In accordance with a particular embodiment of the invention, the normally working passive servocontrol-distributor comprises:

an actuator valve which is mounted on the actuator lever, surrounded by an annular actuator chamber, with a lower actuator chamber and an upper actuator chamber located each side of the actuator valve;

a by-pass valve with a valve rod fitted with a return spring arranged in a by-pass valve chamber, the spring pushing against this valve and against the body, the other end of the by-pass valve having a chamferred edge which, under the action of the spring, comes into contact with the body, an annular by-pass valve chamber being arranged around this valve and which has a drain channel leading into the chamber;

the control loop having:
a first channel which connects the power jack upper chamber to the annular chamber of the by-pass valve which is connected by a third channel to the annular chamber of the actuator valve;
and a second channel connecting the power jack lower chamber to the by-pass valve, which is connected via a fourth channel to the lower actuator chamber of the actuator valve;

two channels linked to the supply of the hydraulic circuit which lead to the by-pass valve, the by-pass valve chamber being linked by a system of channels to the return to the fluid reservoir passing via the upper actuator chamber of the actuator valve; in such a way that when the hydraulic circuit is under pressure, the by-pass valve is moved by the pressure in the supply channel, while at the same time leaving the power-jack upper and lower chambers connected to the return to the fluid reservoir, so that the passive servocontrol-distributor remains inoperative.

Moreover, the normally working passive servocontrol-distributor comprises:

a switching valve mounted on the actuator lever comprising a central chamber and two lands: one lower switching land and one upper switching land located on each side of this central chamber;

a switching piston mounted in the body and in the continuation of the by-pass valve;

channels connecting the bottom of the switching piston to the central chamber of the switching valve which is connected in turn by other channels to the pressurized supply, which acts on the switching piston, to maintain it in the initial lower position, and a system of channels connected to the fluid reservoir return leading to the lower and upper lands of the switching valve; in such a way that when the actuator lever moves upwards or downwards by a value that exceeds the permitted valve, it connects the central switching chamber with one of the channels connected to the fluid reservoir return, the switching piston then moving under the action of the by-pass valve pushed by the pressure to assume the back-up position, this by-pass valve thus connecting the power jack lower chamber to the lower actuator chamber of the actuator valve via the corresponding channels, which are thus linked to the supply, with the by-pass valve cutting the link between the power jack upper chamber and the fluid reservoir return, thus allowing the passive servocontrol-distributor to become operational.

To improve the operation of this normally working passive servocontrol-distributor, the end of the switching piston comprises a bevelled shoulder forming an end chamber. A switching piston lock is mounted perpendicular to the axis of the switching piston which, under the action of a spring, engages in a slot made in the switching piston. Finally, the normally working passive servocontrol-distributor comprises a damper valve which is mounted on the actuator lever with a collar separating a lower damper chamber and an upper damper chamber, both of these chambers being connected to the supply via a system of channels, with the collar having at least one throttling passage linking the two chambers.

Advantageously, each servocontrol of the device, in accordance with the invention, comprises an anchoring system made up of an anchoring jack with means for connecting to the power jack and whose hydraulic circuit is connected to the power jack lower chamber, the anchoring jack being connected to a structural element of the helicopter by coupling means.

More precisely, this anchoring jack comprises a body with a rod carrying two pistons which slide in this body and which, together with this rod and this body, determine a chamber.

Advantageously, in accordance with the invention, the rod of the power jack and the rod of the anchoring jack are a single and same part which constitute the means of connecting the anchoring jack to the power jack. In addition, the hydraulic supply circuit of the anchoring jack is made up of an anchoring jack hydraulic supply channel which is made in the rods of the power jack and of the anchoring jack, in such a way so as to directly link the chamber of the anchoring jack to the power jack lower chamber. Moreover, the two pistons of the anchoring jack are held on the rod on one end by a first collar and on the other end by a second collar formed as an end collar, both of which belong to this rod. The two pistons are kept in position by an anchoring jack spring which pushes them apart, one piston pressing against a bearing face on the body of the anchoring jack and the other piston against the edge of this body.

In accordance with a preferred embodiment of the invention, the means for coupling the anchoring jack to the helicopter comprise an articulation which is connected to a structural element of the helicopter and to the bottom of the body of this anchoring jack. One object of the invention is therefore to provide a low-vulnerability device for controlling the cyclic plates of a helicopter rotor, in which the non-rotating plate is coupled to four hydraulic actuating servocontrols. Each hydraulic servocontrol comprises a power jack connected to an anchoring system and is controlled by a servocontrol-distributor. In this device, in accordance with the invention, three hydraulic actuating servocontrols are active, when normally working while the fourth servocontrol remains in back-up mode. Each hydraulic actuating servocontrol is supplied by a separate hydraulic generator, with the servocontrol-distributor and corresponding power jack forming a monoblock assembly with disengageable anchoring. The anchoring of the three active servocontrols is engaged, while that of the fourth back-up servocontrol is disengaged.

The specific architecture of the invention thus offers the advantage of having monoblock or single-body servocontrols, which are therefore less bulky, cheaper and lighter than servocontrols with separate bodies. Moreover, since each hydraulic circuit is assigned to a specific servocontrol, failure of or damage to one or other of these circuits has no effect on the other servocontrol-hydraulic circuit arrangements. These servocontrols also present the advantage of being directly linked to hydraulic anchoring devices, in contrast to electrical anchoring systems, which call for detection systems and special commands to synchronize the engagement and disengagement of the anchorings and servocontrols.

Another characteristic of the invention is that it has automatic detection and conversion means, without any intervention required on the part of the pilot who is simply informed of what is taking place. Moreover, in accordance with the invention, the block or arrival at an end stop of a servocontrol is detected by detecting force on the input lever. This is possible because there are three active servocontrols, with force only appearing on the one concerned. With four active servocontrols, force also appears on the facing servocontrol, and this is why the use of four active servocontrols is not applicable to the system of the invention.

Additional advantages will appear hereinafter from the detailed and non-limiting description of a number of particular embodiments of the invention and from the disclosure set forth by the drawings wherein.

Figure 1:
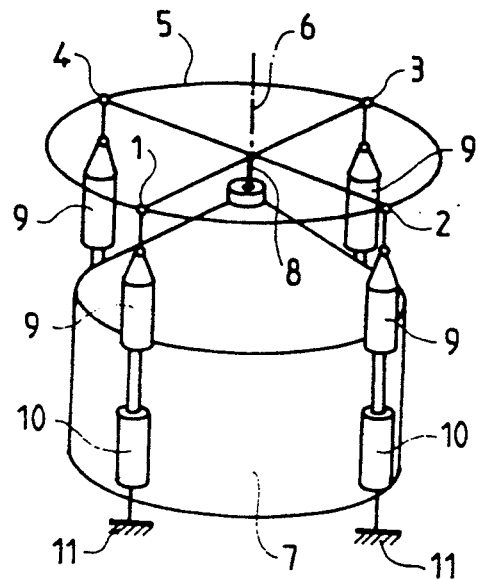
FIG. 1 is a diagrammatic perspective view of the complete low-vulnerability device for controlling the cyclic plates of a helicopter rotor, in accordance with the invention, with four actuator units.
Figure 2:
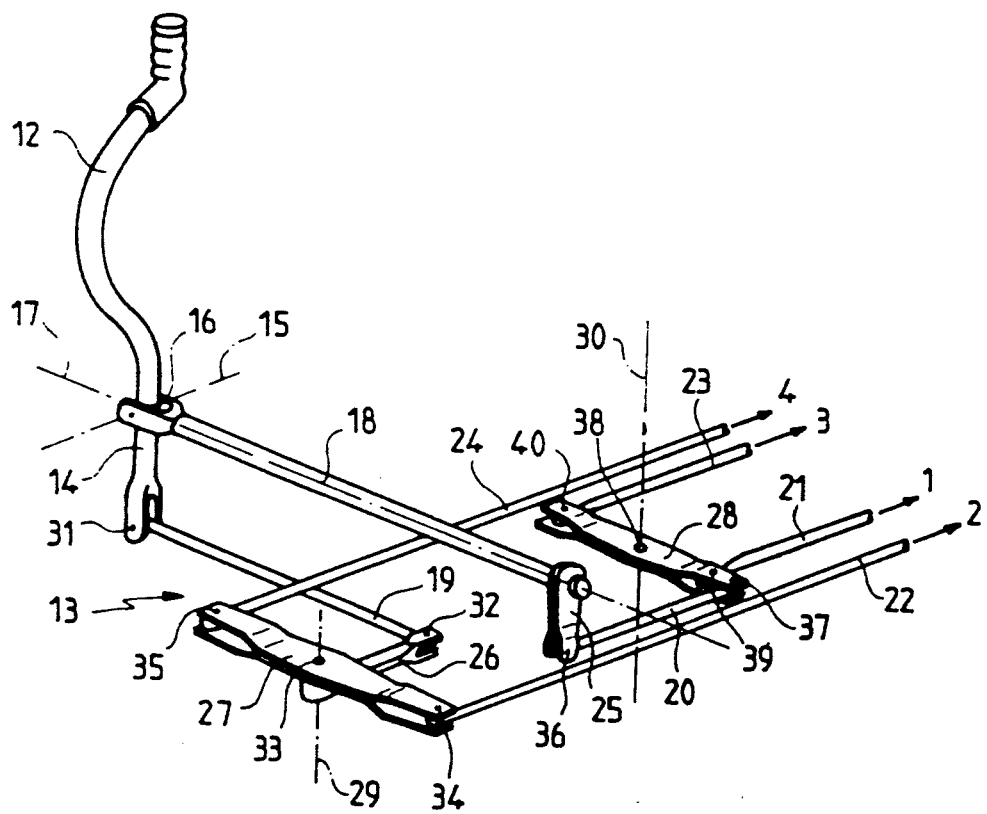
FIG. 2 is a perspective view of the adaptation of conventional control linkage for the pitch and roll control of four actuator units in accordance with the invention.

The low-vulnerability device for controlling the cyclic plates of a helicopter rotor is shown diagrammatically in perspective in FIG. 1. The low-vulnerability device for operating a lifting and propulsing helicopter rotor is realized by means of a cyclic plate mechanism in which the cyclic plates are mounted coaxially on the drive shaft of rotor 6. The cyclic plate mechanism comprises one rotating plate and one non-rotating plate. The rotating plate is individually coupled around its peripheral part with a rod that controls the pitch of each blade of the rotor. The non-rotating plate 5 is coupled to four hydraulic servocontrols at four points 1, 2, 3, 4, regularly arranged around its periphery. Each hydraulic servocontrol comprises a power jack 9, an anchoring system 10 and a servocontrol-distributor 41, 42. These hydraulic servocontrols are arranged around the periphery of the helicopter's main transmission box 7 and each anchoring system 10 is mounted on a structural element 11 of the helicopter.

In accordance with the invention, there are three normally working active servocontrols, the fourth being used in the event of an emergency if one of the other three fails, thus ensuring continued control by three servocontrols.

The control linkage, referenced as a whole by 13, is arranged in such a way as to ensure displacement of the three normally working active servocontrols as well as the fourth normally working passive servocontrol, to command the tilting of the cyclic plate controlling rotor pitch and roll. Control linkage 13 comprises a cyclic stick 12 fitted in the cockpit, this stick being mounted on an articulation 16 in such a way that it is able to pivot from left to right for roll movement control and forwards and backwards for pitch movement control. These different movements are made possible by articulation 16 which pivots about a longitudinal pivoting axis 15 for left and right roll movements and about a transversal pivoting axis 17 for forward and backward pitch movements. Articulation 16 is arranged at the lower portion of cyclic stick 12 which continues below articulation 16 via a lever 14. A connecting shaft 18 is mounted along the transversal pivoting axis and terminates at one end in a fork which receives cyclic stick 12 with its articulation 16. The other end of connecting shaft 18 comprises a lever 25 fitted with an articulation 36 which receives the end of connecting rod 20. The other end of connecting rod 20 is joined by an articulation 37 to a crossbar 28, which turns on articulation 38 about a pivoting axis 30. One end of crossbar 28 is fitted with an articulation 39 to which the end of the control linkage 21 is mounted for the control of point 1. The other end of crossbar 28 is fitted with an articulation 40 to which the end of control linkage 23 is fitted for the control of point 3. One end of connecting rod 19 is mounted on the forked end of lever 14 by articulation 31. The other end of connecting rod 19 is mounted by an articulation 32 on the fork of lever 26. Lever 26 turns about pivoting axis 29 by an articulation 33 where it is joined to crossbar 27. This crossbar 27 comprises at one end, an articulation 34 on which the end of the control linkage 22 is mounted for the control of point 2, and at the other end an articulation 35 on which the end of the control linkage 24 is mounted for the control of point 4.

Left and right roll control movements on cyclic stick 12 result in the opposite movement of articulation 31 on lever 14. This causes connecting rod 19 to move along its axis and the end of lever 26 to rotate about pivoting axis 29. Crossbar 27 thus rotates and displaces control linkage 22 and 24 along their axes to control points 2 and 4. Forward and backward pitch control movements on cyclic stick 12 cause connecting shaft 18 to rotate about its axis which in turn rotates lever 25. This displaces connecting rod 20 along its axis which in turn rotates crossbar 28 about axis 30 and moves control linkage 21 and 22 along their axes to control points 1 and 3.

In the description that follows, the term servocontrol refers to the whole of each of the four mechanisms coupled to the non-rotating cyclic plate 5. Each of these servocontrols comprises:

a power jack 9, an anchoring system 10 that anchors said power jack 9, a servocontrol-distributor, referenced 41 or 42 depending on the case, which is supplied with pressurized hydraulic fluid and into which the mechanical input control is introduced.

Each control linkage 21, 22, 23 and 24 is linked respectively to the mechanical input command of the corresponding servocontrol at points 1, 2, 3 and 4 of non-rotating plate 5.

The collective pitch control which, by suitable control linkage, transmits displacements of the collective pitch lever simultaneously and by the same values to the mechanical inputs of the four servocontrols, has not been shown in the drawings, since this is performed in a conventional, well-known fashion.

The low-vulnerability device for operating a lifting and propulsing helicopter rotor comprises essentially:

four hydraulic generators each supplying hydraulic fluid under pressure to a servocontrol, single body servocontrols with disengageable anchoring, three active servocontrols with their anchoring blocked, a fourth, passive servocontrol, i.e. set in by-pass mode with its anchoring maintained by a threshold, the mechanical input of the active servocontrols comprises a system which, above a force threshold, triggers:

setting to by-pass of power jack 9, disengaging of anchoring 10,

The mechanical input of the passive servocontrol comprises a system which, above a force threshold, triggers:

bringing into operation of the servocontrol, blocking of anchoring 10.

Thus, in accordance with the invention:

each power jack 9 is supplied by a hydraulic circuit which is independent of the circuits supplying the other power jacks 9, this hydraulic circuit comprising, depending on the case, servocontrol-distributor 41 or 42 which is operated by a mechanical input linked to the cockpit by control linkage 13 and by the collective pitch control linkage not shown;

each power jack 9 comprises a disengageable anchoring system;

the three servocontrol-distributors 41 are structurally arranged so as to be active when normally working and to block the anchoring system of each corresponding power jack 9, and servocontrol-distributor 42 is structurally arranged so as to be normally passive when working normally and to maintain the anchoring system of the corresponding power jack 9 disengaged;

each of the mechanical inputs of these four servocontrol-distributors 41, 42 comprise a system which, in the event of a force threshold being exceeded on one of the three normally working active servocontrol-distributors 41, neutralizes this servocontrol-distributor and initiates the starting up of the normally working inactive servocontrol-distributor 42 which then becomes operational in back-up mode.

Figure 3:
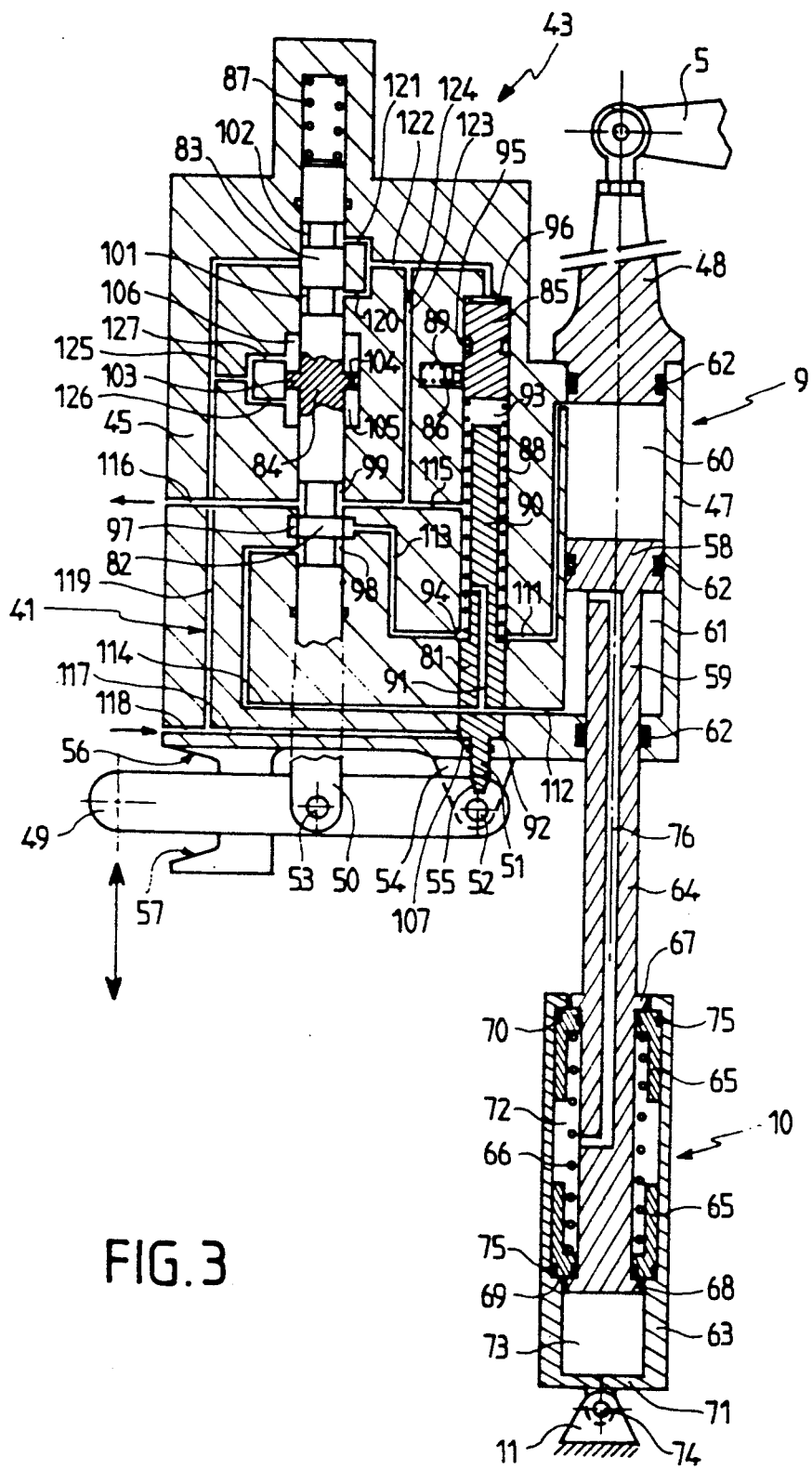
FIG. 3 is a general cross-sectional view along the axis of the jacks and valves of a normally working active servocontrol in which the hydraulic circuit is not under pressure.
Figure 4:
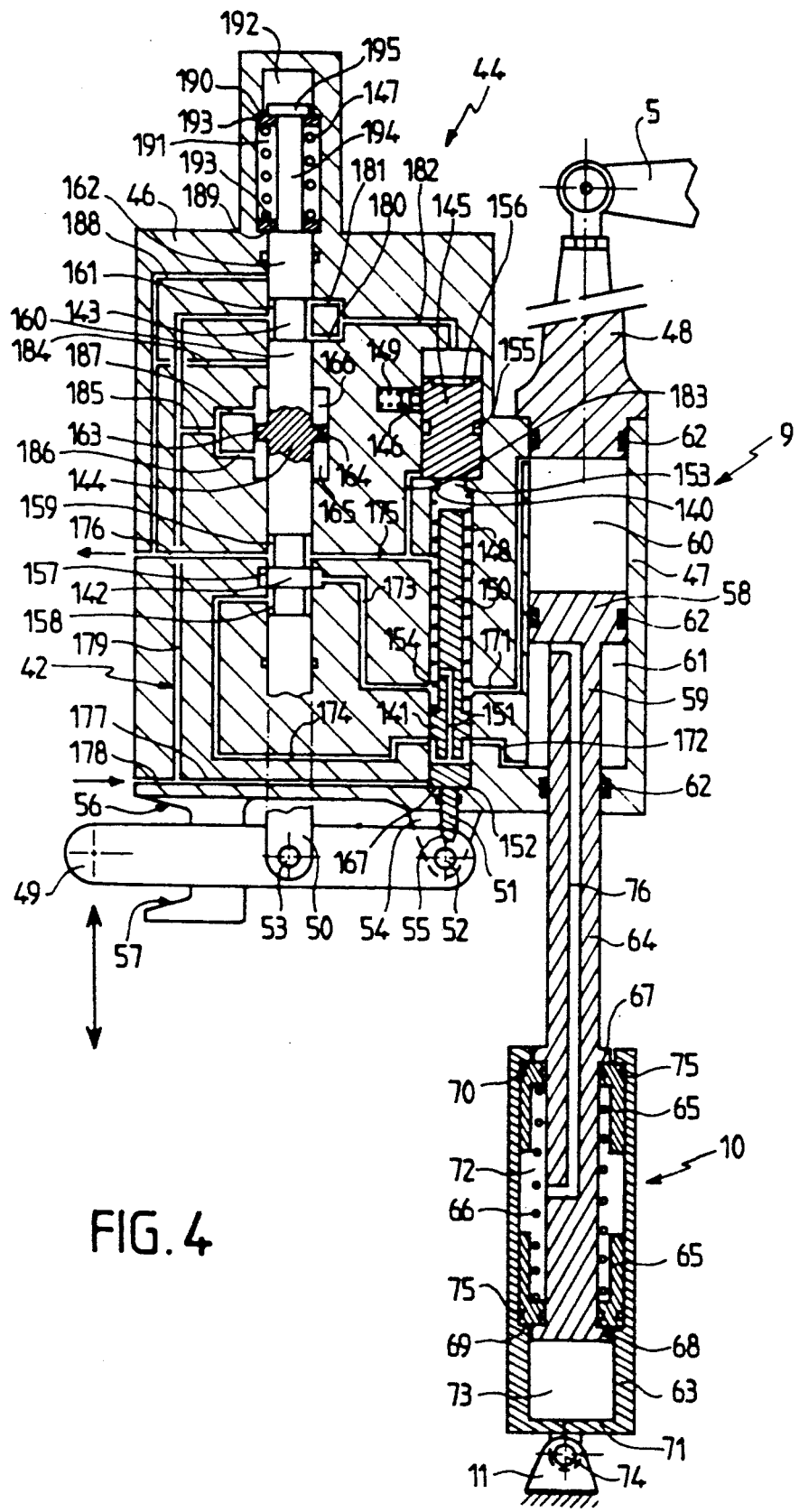
FIG. 4 is a general cross-sectional view along the axis of the pistons and valves of a normally working passive servocontrol in which the hydraulic circuit is not under pressure.

FIG. 3 shows a complete normally working active servocontrol and FIG. 4 the normally working passive servocontrol, both of which are shown with their hydraulic circuits not supplied, i.e. without pressure, corresponding to the helicopter on the ground. Each normally working active servocontrol comprises a servocontrol-distributor 41 which supplies a power jack 9 connected to an anchoring jack 10, the mechanical input being made up of an input lever 49. Servocontrol-distributor 41 is incorporated in power jack 9, so that body 45 of servocontrol-distributor 41 and body 47 of power jack 9 constitute a single monoblock assembly 43 on which input lever 49 is mounted. Likewise, the passive servocontrol is made up of the corresponding servocontrol-distributor 42, power jack 9 and anchoring jack 10, the mechanical input being made up of an input lever 49. Servocontrol-distributor 42 is incorporated in power jack 9, so that body 46 of servocontrol-distributor 42 and body 47 of power jack 9 form a single monoblock assembly 44 on which input lever 49 is mounted. Thus, in accordance with the embodiments shown in FIGS. 3 and 4, power jacks 9, anchoring jacks 10 and the mechanical input systems with input lever 49 are identical, while servocontrol-distributors 41 and 42 have their own hydraulic circuit and elements.

Servocontrol-distributors 41 and 42 each comprise:

a distribution assembly with a control loop between the position of body 47 of power jack 9 and the position of the corresponding mechanical input;

a system for switching this control loop so as to place it in the opposite state to that corresponding to normal working of the control device of the non-rotating plate 5 of the cyclic plates.

The control loop establishes a link between the position of body 47 of power jack 9, i.e. the position of the corresponding monoblock assembly 43, 44 and the position of the mechanical input mounted on this monoblock assembly 43, 44, by means of a control system linked to the mechanical input. The control loop has thus feedback information concerning the position of body 47 of power jack 9, which acts directly on the position of the mechanical input mounted on the corresponding monoblock assembly 43, 44 by a control system linked to the mechanical input. In this way, any change in the position of the mechanical input in relation to the monoblock assembly 43, 44 in response to a pilot manoeuver causes displacement of body 47 of power jack 9, i.e. it causes the displacement of the corresponding monoblock assembly 43, 44, until the mechanical input is returned to its initial relative position in relation to this monoblock assembly 43, 44.

To achieve this, the control loop is connected to the supply pressure of the corresponding separate hydraulic circuit, and the control system to the fluid reservoir of this separate circuit, and comprises an actuator valve 82, 142 which is linked to the corresponding mechanical input.

Each power jack 9 has a differential section and comprises a power jack piston 58 with a power jack rod 59 linked to the anchoring system, in such a way so as to provide a power jack upper chamber 60 and a power jack lower chamber 61 located on the side of rod 59. The power jack upper chamber 60 and power jack lower chamber 61 are both connected to the control loop, in such a way that when power jack 9 operates, power jack lower chamber 61 is still connected to the pressurized hydraulic circuit.

Each anchoring system comprises an anchoring jack 10 provided with link means with corresponding power jack 9. Each anchoring jack 10 is linked by coupling means to a structural element 11 of the helicopter. Moreover, in accordance with a characteristic of the invention, the anchoring jack's hydraulic circuit is linked to lower chamber 61 of the corresponding power jack 9.

Anchoring jack 10 comprises an anchoring jack body 63 and a rod 64 carrying two anchoring jack pistons referenced 65, which slide in body 63 and which with rod 64 and body 63, determine an anchoring jack chamber 72. Rod 64 of anchoring jack 10 and rod 59 of the corresponding power jack 9 form a single common part which forms the means for linking or link means of anchoring jack 10 with power jack 9. The two anchoring jack pistons 65 are held on rod 64 by a first collar 67, located on the rod 64 in the direction of power jack 9, and by a second collar formed as an end collar 68 on the rack 64, both of which belong to rod 64. Moreover, an anchoring jack spring 66 is positioned on this rod 64 between the two anchoring jack pistons 65, in such a way so that the spring pushes these two pistons away from each other in order to hold them in place, so that one piston 65 presses against bearing face 69 made in the bottom inside body 63, and the other piston 65 presses against edge 70 of body 63 located on the opposite side, i.e. on the side of power jack 9. Thus, body 63 of anchoring jack 10 comprises a bearing face 69, which determines a clearance chamber 73 in the lower part of this anchoring jack 10 making it possible to displace rod 64 inside body 63. The means for coupling or coupling means of this anchoring jack 10 are mounted below bottom 71 of body 63 and are made up of an articulation 74 which is connected to a structural element 11 of the helicopter and bottom 71 of body 63.

The hydraulic supply circuit of anchoring jack 10 is made up of an anchoring jack hydraulic supply channel 76 made in rod 59 of power jack 9 and in rod 64 of anchoring jack 10, in such a way so that chamber 72 of anchoring jack 10 is directly connected to lower chamber 61 of power jack 9.

To ensure the sealing of the hydraulic circuit of the anchoring jack 10, both pistons 65 have seals 75 arranged inside and outside of these pistons, in contact respectively with rod 64 and body 63.

The upper portion of each power jack 9 is closed by an attachment 48 which is connected to the corresponding part of the periphery of non-rotating plate 5. To provide efficient sealing of this power jack 9, seals 62 are arranged at the lower portion of body 47 to work with rod 59, in power jack piston 58 and in attachment 48, to press against the internal walls of body 47.

The control loop switching system of each servocontrol comprises:
  a by-pass valve 81, 141 of the power jack 9 which is mounted in this control loop;
  a two position switching piston 85, 145;
  a switching distributor 83, 143 which acts on switching piston 85, 145 to provide two positions:
    an initial position in which switching piston 85, 145 works with the by-pass valve 81, 141 to obtain normal working of the servocontrol-distributor of corresponding power jack 9;
    a back-up position in which switching piston 85, 145 works with by-pass valve 81, 141 to obtain back-up working of servocontrol-distributor 41, 42 of the corresponding power jack 9.

The switching system works with the control loop by means of by-pass valve 81, 141 mounted on main hydraulic supply supply channel 117,118-177,178 of the control loop and which is connected to a pressurized hydraulic fluid source in such a way that this by-pass valve 81, 141 has at least two positions:
  one position corresponding to the control loop without pressure,
  one position corresponding to the control loop under pressure,
Switching piston 85, 145 is locked in the back-up position by a switching piston lock, referenced respectively 86, 146.

In the embodiments shown in FIGS. 3, 4, the mechanical input has a by-pass lock piece 51 which is carried by by-pass valve 81, 141 which makes the lock piece possible for it to act on the mechanical input. Moreover, actuator valve 82, 142 and the corresponding switching distributor are part of the same part, i.e. an actuator lever 50 linked to the mechanical input made up of input lever 49.

Each mechanical input is formed by an actuator lever 49 mounted under the body 45, 46 of the corresponding servocontrol-distributor 41, 42. This input lever 49 is mounted by an articulation 52 provided at one end of this lever 49. The other end of lever 49 receives the input movement via the corresponding system. Actuator lever 50 is linked to input lever 49 by an articulation 53 provided between the input of the movement and mounting articulation 52 of input lever 49. Input lever 49 is placed between two end stops: an upper end stop 56 and a lower end stop 57 which are integral and fitted under body 45, 46 of the corresponding servocontrol-distributor 41, 42. Mounting articulation 52 of input lever 49 is supported by two lugs 54 made under the body 45, 46 of the corresponding servocontrol-distributor 41, 42. Moreover, input lever 49 comprises a recessed hole 55 made in the upper side of mounting articulation 52. The recessed hole 55 forms the other part of the by-pass lock receiving lock piece 51 carried by the by-pass valve 81, 141 whereby locking input lever 49. This recessed hole 55 and lock piece 51 have conjugate shapes in the form of a substantially truncated cone.

Finally, each servocontrol-distributor 41, 42 comprises a damper mounted on actuator lever 50. This damper only becomes effective after a certain distance of travel of the actuator lever so as to stop it reaching its end positions in the event of a rapid but brief input lever manoeuver. Actuator lever 50 also comprises an elastic return system located at the end of actuator lever 50 on the side opposite to input lever 49.

As can be seen in FIG. 3, the three normally working active servocontrol-distributors 41 each comprise:

actuator valve 82 mounted on actuator lever 50, surrounded by annular actuator chamber 97 with a lower actuator chamber 98 and an upper actuator chamber 99 located each side of actuator valve 82;

by-pass valve member 81 with a by-pass valve rod 90 fitted with a by-pass valve spring 88, arranged in a by-pass valve chamber 93, the by-pass valve spring on one end against one end of this valve member 81 and on the other end against one side of switching piston 85, the other end 107 of by-pass valve 81 having a chamferred edge 92 which, under the action of spring 88, comes into contact with the bottom of the recessed hole in body 45, and a by-pass valve annular chamber 94 being arranged around valve 81, and the valve 81 having a drain channel 91 leading into chamber 93;

the control loop has a first channel 111 connecting power jack upper chamber 60 to by-pass valve annular chamber 94, which is itself connected by second channel 113 to annular actuator chamber 97 of the actuator valve, and also a third channel 112 connecting power jack lower chamber 61 to by-pass pass valve 81 which is connected by a fourth channel 114 to the lower actuator chamber 98 of the actuator valve;

first main hydraulic supply channel 118 which is connected to the hydraulic circuit supply and to second main hydraulic supply channel 117 which leads to by-pass valve 81.

main hydraulic return channel 116 which is connected to the hydraulic fluid reservoir return and which leads into upper actuator chamber 99 of the actuator valve, the upper actuator chamber being connected by by-pass return channel 115 to by-pass chamber 93 of by-pass valve 81.

All these elements form the control loop distribution assembly in which the switching system comprises:

switching valve 83 mounted on actuator lever 50 with a lower switching chamber 101 and an upper switching chamber 102, these chambers being located each side of switching valve 83;

switching piston 85 mounted in body 45 and in the continuation of by-pass valve 81, in such a way that by-pass valve spring 88 presses against switching piston 85;

switching control channel 122 which connects the face of switching piston 85 opposite the by-pass spring 88 to lower chamber 101 via switching distributor first switching supply channel 120, and to switching distributor upper chamber 102 via a second switching supply channel 121, and also main switching supply channel 119 which connects switching valve 83 to the first main hydraulic supply channel 118.

Switching piston 85 comprises in its upper portion a bevelled shoulder which forms an end chamber 96 and into which switching control channel 122 leads.

Switching position lock 86 is mounted perpendicularly to the axis of switching piston 85, and is pushed by a switching piston lock spring 89 mounted in a housing a body 45 in such a way that switching piston lock 86 is able to engage in a locking slot 95 made in switching piston 85.

The damper is made up of a damper valve 84, mounted on actuator lever 50, and comprises a damper collar 103 which separates a lower damper chamber 105 from an upper damper chamber 106, both of which are connected to first main hydraulic supply channel 118 by a damper main supply channel 125. The damper main supply channel 125 is connected via damper lower supply channel 126 to lower damper chamber 105 and via damper upper supply channel 127 to upper damper chamber 106, collar 103 having at least on e throttling passage 104 which connects the two chambers 105 and 106.

The elastic return system on actuator lever 50, which is arranged at the end opposite to input lever 49, comprises a compression return spring 87. This return spring 87 is mounted in a housing provided in body 45 of servocontrol-distributor 41 and presses against the bottom of this housing and against the end of actuator lever 50.

The switching circuit also comprises a link channel 123 arranged between the by-pass return channel 115 connected to by-pass valve chamber 93 and the switching control channel 122 of switching piston 85. This link channel 123 is provided with a throttling portion 124.

The looped distribution assembly of passive servocontrol-distributor 42 in normal working comprises:

an actuator valve 142 which is mounted on actuator lever 50 and surrounded by an annular actuator chamber 157, comprising a lower actuator chamber 158 and an upper actuator chamber 159 which are located each side of actuator valve 142;

a by-pass valve member 141 with a by-pass valve rod 150 on which by-pass valve spring 148 is mounted, the by-pass valve spring being arranged in a by-pass valve chamber 153 and pressing on the one end against one end of by-pass valve 141 and on the other end against body 46, the other end face 167 of by-pass valve 141 being provided with a chamferred edge 152 which, by the action of by-pass valve spring 148, comes into contact with the bottom of body 46, an annular by-pass valve chamber 154 being arranged around this valve 141 and which has a drain channel 151 leading into by-pass valve chamber 153;

the control loop which comprises:
  a first channel 171 which connects power jack upper chamber 60 to annular by-pass valve chamber 154, which is in turn connected via second channel 173 to annular actuator chamber 157.
  and a third channel 172 which connects power jack lower chamber 61 to by-pass valve 141, which is in turn connected via fourth channel 174 to lower actuator chamber 158;

first main hydraulic supply channel 178 which is connected to the hydraulic circuit supply, and to second main hydraulic supply channel 177 which leads into by-pass valve 141; main hydraulic return channel 176, which is connected to the fluid reservoir return and which leads into upper actuator chamber 159 connected via by-pass return channel 175 to by-pass chamber 153 of by-pass valve 141.

The switching circuit of the control loop of normally working passive servocontrol-distributor 42 comprises:

switching valve 143 mounted on actuator lever 50 comprising a central chamber 161 and two lands: one lower switching land 160 and one upper switching land 162 located each side of this central chamber 161;

switching piston 145 mounted in body 46 and in the continuation of by-pass valve 141;

switching control channel 182 which connects the bottom of switching piston 145 to central chamber 161 of switching valve 143 via two switching supply channels 180 and 181, switching valve 143 itself connected via main switching supply channel 179 to first main hydraulic supply channel 178, the pressure from first main hydraulic supply channel 178 acting on switching piston 145 to keep it in the initial bottom position, first switching drain channel 184 being connected to main hydraulic return channel 176 connected to the fluid reservoir return and leading to lower switching land 160, with second switching drain channel 188 connected to first switching drain channel 184 and leading to upper switching land 162.

Switching piston 145 comprises a bevelled shoulder forming an end chamber 156, which is arranged at its end in such a way that switching control channel 182 leads into this end chamber 156.

Switching piston lock 146 on switching piston 145 is mounted perpendicularly to the axis of switching piston 145, and is pushed by spring 149 housed in body 46 to enable it engage in locking slot 155 made in switching piston 145.

The damper mounted on actuator lever 50 is made up of a damper valve 144, and comprises a damper collar 163 which separates a lower damper chamber 165 from an upper damper chamber 166. Lower damper chamber 165 and upper damper chamber 166 are both connected to first main hydraulic supply channel 178 via damper main supply channel 185 which branches from main switching supply channel 179. Damper main supply channel 185 is itself connected via damper lower supply channel 186 to lower damper chamber 165, and via damper upper supply channel 187 to upper damper chamber 166. Moreover, collar 163 has at least one throttling passages 164 which connects the two chambers 165 and 166.

The elastic return system mounted on actuator lever 50 is located at the end opposite input lever 49. This elastic return system is made up of a compression return spring 147 which is mounted on return rod portion 194 of actuator lever 50. This compression return spring 147 is arranged between two washers, referenced 193, located at each end and which are held by return rod collar 195 made int eh upper end of actuator lever 50. On of the washers 193 presses against a bearing face 189 on body 46 of servocontrol-distributor 42, and the other washer 143 presses against a bearing face 190 on body 46.

FIG. 3 shows one of the three active servocontrols in its normal position, in the case where the hydraulic circuit supplying power jack 9, anchoring jack 10 and servocontrol-distributor 41 is not under pressure, this corresponding to the case of the helicopter being on the ground. Spring 88 of by-pass valve 81 pushes by-pass valve 81 back against the bottom of body 45 causing by-pass valve 81 to engage by-pass lock piece 51 in recessed hole 55 of input lever 49 thereby locking the lever in one position. Switching piston 85 is pressed back against the bottom of its housing in body 45 by spring 88 of the by-pass valve. Switching piston 85 is in the unlocked position, and it pushes switching piston lock 86 back into its housing thereby compressing switching piston lock spring 89. Actuator lever 50 is locked by lever 49 in its central position, which means that actuator valve 82 and switching valve 83 are also in the central position since they are formed as part of this actuator lever 50.

The control loop circuit of this power jack 9 is in the by-pass configuration via drain channel 91 of by-pass valve 81, i.e. power jack upper chamber 60 and power jack lower chamber 61 are connected to the fluid reservoir via by-pass return channel 115 and main hydraulic return channel 116. Power jack 9 is therefore free to perform movements according to the position of the controls, in order to follow non-rotating plate 5.

Since power jack lower chamber 61 is connected to the fluid reservoir, anchoring jack 10 is hydraulically disengaged. However, anchoring jack 10 is held in the anchoring position by the anchoring jack spring 66 which presses the two pistons 65 against bearing face 69 and against edge 70 of body 63 respectively.

Figure 5:
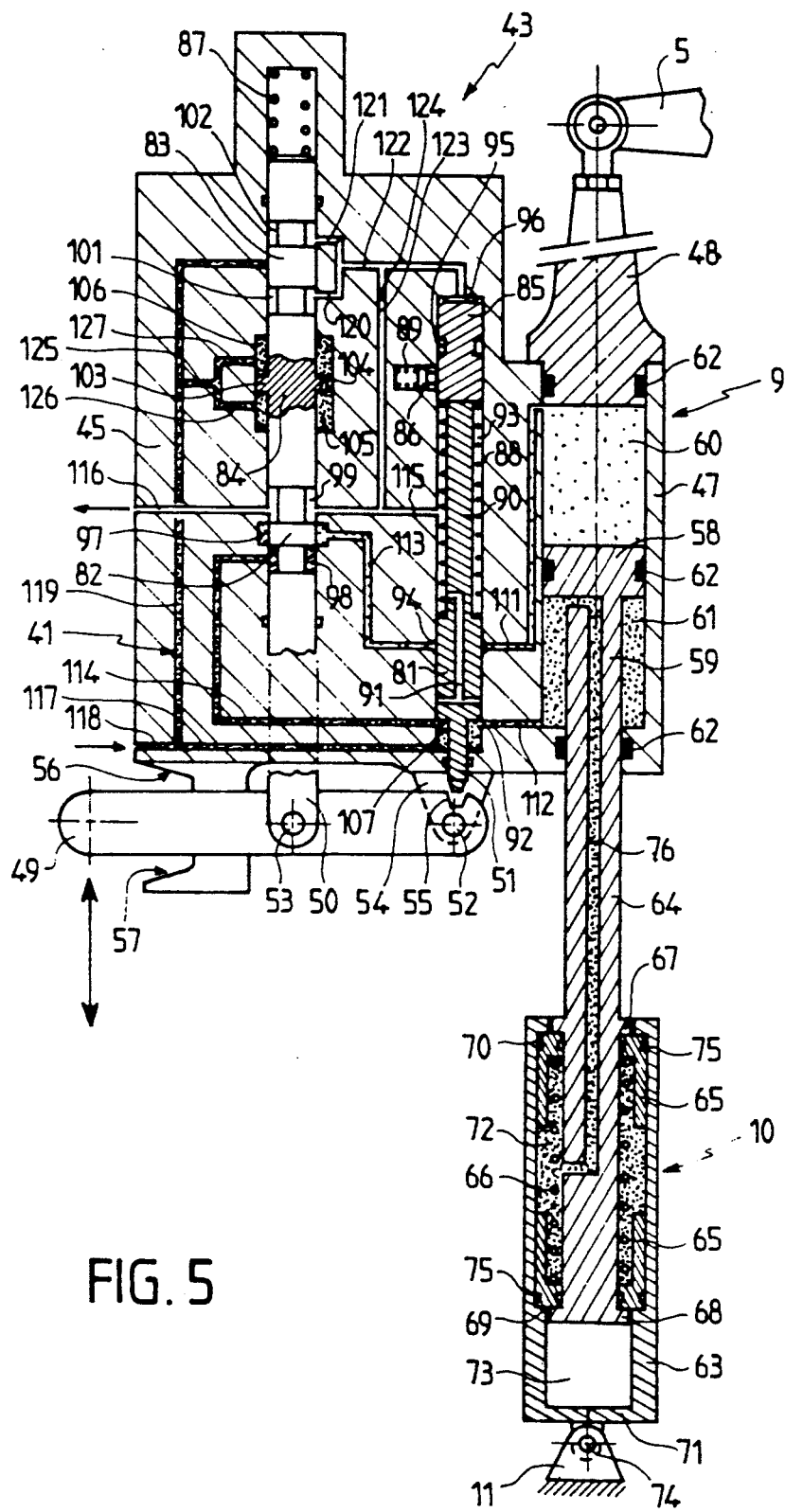
FIG. 5 is a similar view to the one shown in FIG. 3 but with the hydraulic circuit under pressure, corresponding to the normally working engaged position.

FIG. 5 shows one of the three active servocontrols in the normal position, in the case where the assembly formed by the hydraulic circuit of power jack 9, anchoring jack 10 and servo control-distributor 41 is brought under pressure, which corresponds to the case of the helicopter operating normally. The pressure in the hydraulic circuit therefore arrives in first main hydraulic supply channel 118 and acts on chamferred edge 92 and its corresponding face 107 of by-pass valve 81. By-pass valve 81 therefore moves, pushing back spring 88, in such a way so as to come up against switching piston 85. When by-pass valve 81 moves, it releases the by-pass lock piece 51 from recessed hole 55 which unlocks input lever 49 and allows it to freely control actuator lever 50, i.e. actuator valve 82 and switching valve 83 which belong to this actuator lever 50.

When by-pass valve 81 moves, it removes the by-pass, i.e. it breaks the connection between drain channel 91 and first channel 111 to power jack upper chamber 60, and between drain channel 91 and third channel 112 to power jack lower chamber 61. When by-pass jack 81 moves, it connects first main hydraulic supply channel 118 to third channel 112 to power jack lower chamber 61, and also to fourth channel 114 which leads into lower actuator chamber 98 of actuator valve 82. As a result, the circuit of the control loop is supplied, and anchoring jack chamber 72 of anchoring jack 10 is constantly under pressure since it is connected via channel 76 from power jack lower chamber 61 and by third channel 112 from first main hydraulic supply channel 118. Anchoring jack 10 is thus in the locked position.

Input lever 49 can normally move within the usual control range since it is in the unlocked position. However, input lever 49 can only reach the high end stop 56 or low end stop 57 following the movement of the end limit damper i.e. damper valve 84, this not being possible in normal control conditions. Moreover, input lever 49 can not be placed in a limit position during initial pressure generation, since it is held in the neutral position by lock piece 51 which is engaged in recessed hole 55.

The hydraulic circuit of the control loop is therefore under pressure, due to the movement of by-pass valve 81 in response to pressure in second main hydraulic supply channel 117, and connects power jack lower chamber 61 to lower actuator chamber 98 via third and fourth channels 112 and 114, which are then connected to the first and second main hydraulic supply channels 118 and 117. When input lever 49 moves, actuator lever 50 also moves and drives actuator valve 82 which connects power jack upper chamber 60 to lower actuator chamber 98 or to upper actuator chamber 99, depending on the direction of movement of actuator lever 50, so that body 47 of power jack 9 then moves until actuator valve 82 returns to its balanced position.

Figure 6:
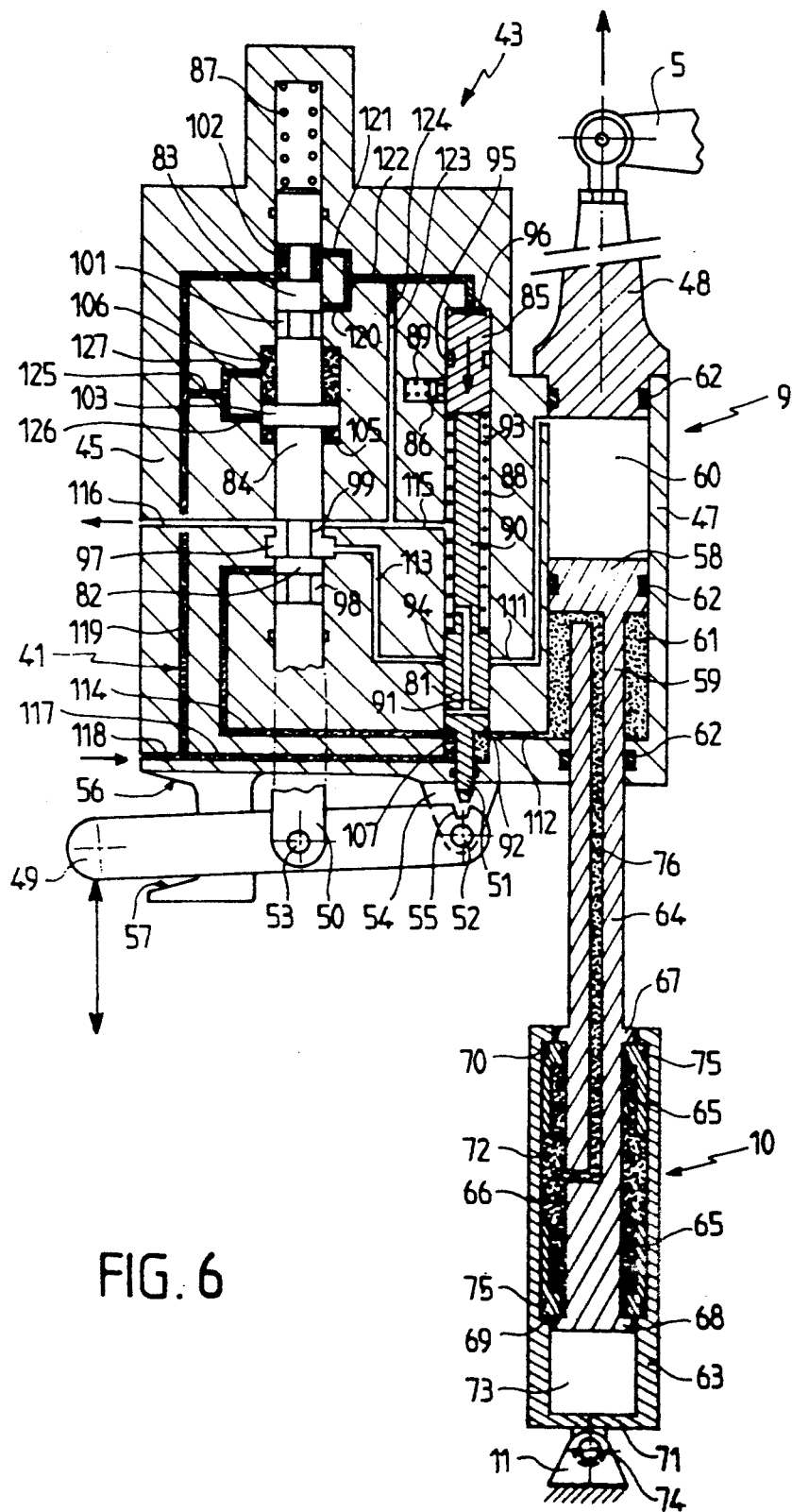
FIG. 6 is a similar view to the one shown in FIG. 3 with the hydraulic circuit under pressure and with the different elements in the disengaging phase at the time of the failure.

FIG. 6 shows one of the three active servocontrols in the normal position, in the case of a failure caused, for example, by a missile hit that results in power jack 9 blocking. The servocontrol is no longer able to move, and the control force takes input lever 49 to one of these upper 56 or lower 57 end stops, moving damper valve 84.

Actuator lever 50 therefore moves upwards or downwards by a value greater than the permitted value, and connects the switching circuit to first main hydraulic supply channel 118. When actuator lever 50 moves, it moves switching valve 83 downwards or upwards and allows switching control channel 122, which leads into end chamber 96 of switching piston 85, to connect with main switching supply channel 119 connected to first main hydraulic supply channel 118. For this, when actuator lever 50 moved, it connected the switching chamber 101 or upper switching chamber 102 to, at one side main switching supply channel 119, and on the other, either to first switching supply channel 120 or second switching supply channel 121, both of which are connected to switching control channel 122 leading to switching piston 85. In the case shown in FIG. 6, the actuator lever 50 has moved downwards, upper switching chamber 102 then connecting piston 85 to first main hydraulic supply channel 118 via channels 122, 121 of upper switching chamber 102, and main switching supply channel 119. The pressure therefore acts in end chamber 96 of switching piston 85 which moves downwards, i.e. in the direction of the arrow shown on piston 85 in FIG. 6, which thus pushes back by-pass valve 81 until its face 107 comes up against the bottom of the housing of body 45.

Figure 7:
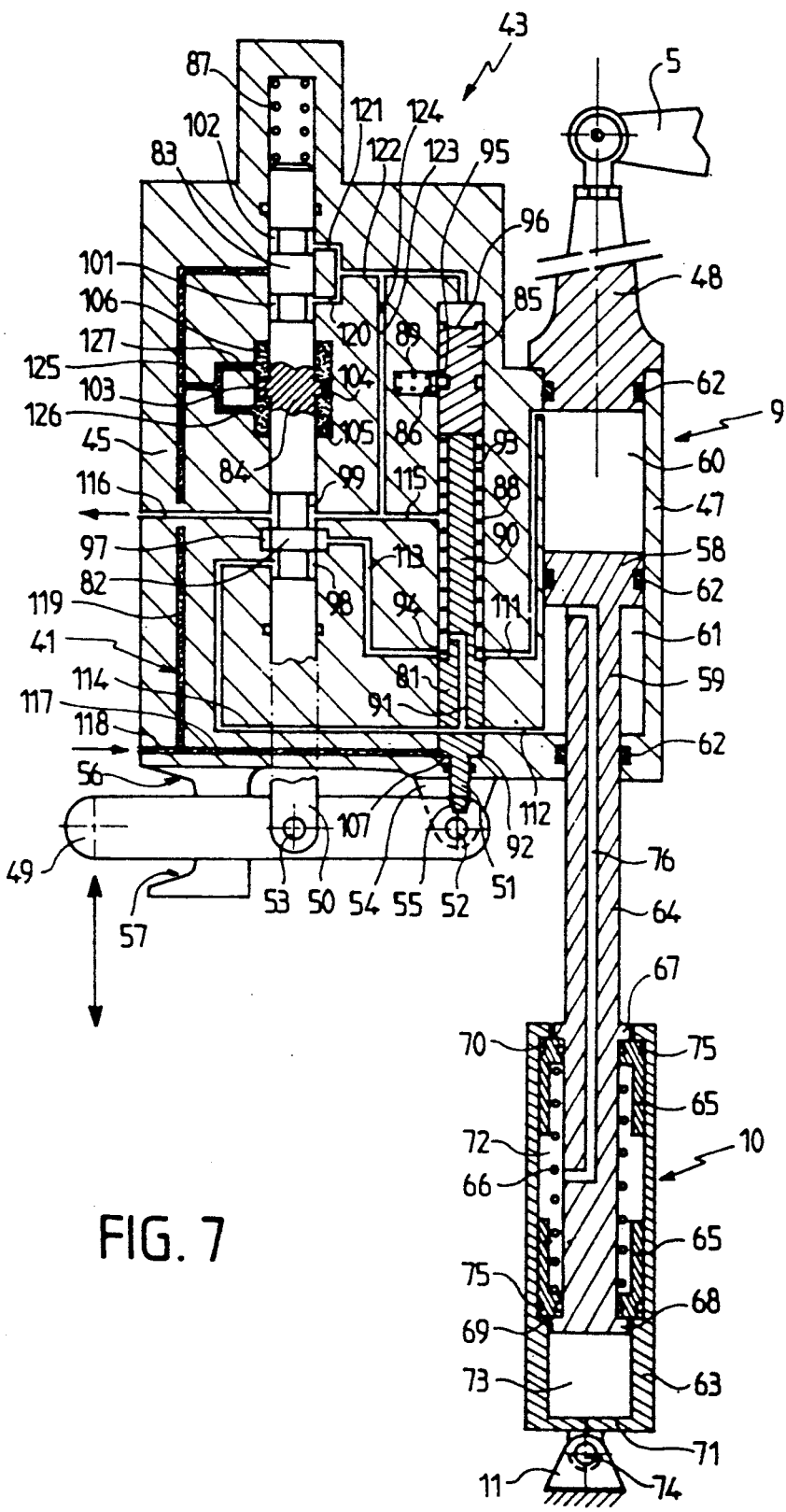
FIG. 7 is a similar view to the one shown in FIG. 3 but with the hydraulic circuit under pressure and the different elements in the disengaged phase after the failure.

FIG. 7 is a figure similar to FIG. 6, i.e. it shows one of the three active servocontrols in the normal position, in the case where this servocontrol has been neutralized immediately following failure. Switching piston 85, as was the case in FIG. 6, has moved to the back-up position, i.e. The position corresponding to that where face 107 of the by-pass valve comes up against the bottom of the housing of body 45. By-pass valve 81 thus connects power jack upper chamber 60 and power jack lower chamber 61 of power jack 9 to the fluid reservoir return. For this, drain channel 91 of by-pass valve 81 connects third channel 112 connected to power jack lower chamber 61, and fourth channel 114 connected to lower actuator chamber 98 of actuator valve 82, to by-pass valve chamber 93, which is itself connected to the fluid reservoir via by-pass return channel 115, upper actuator chamber 99 of actuator valve 82, and main hydraulic return channel 116. In this position, by-pass valve 81 also connects first channel 111, connected to power jack upper chamber 60, to second channel 113 connected to the annular actuator chamber of actuator valve 82 which is in turn connected to by-pass valve chamber 93 via annular by-pass chamber 94.

The control loop circuit of the power jack is thus connected to the fluid reservoir, i.e. power jack upper chamber 60 and power jack lower chamber 61 are connected to this fluid reservoir, and as a result, anchoring jack chamber 72 is also connected to the fluid reservoir return.

The switching piston is in the back-up position, and is held in position by means of the switching piston lock 86 which engages in slot 95 of switching piston 85. In addition, when by-pass valve 81 moves downwards, it engages lock piece 51 in recessed hole 55, which locks input lock 49 in the locked position, bringing actuator lever 50 back to the central position. The servocontrol then becomes inoperative and is held in this position where it is neutralized by switching piston 85. As a result, this servocontrol is able to follow the movements of non-rotating plate 5 without exerting any action on it, since all the chambers of power jack 9 and of anchoring jack 10 are connected to the fluid reservoir return.

FIG. 4 shows the passive servocontrol in the normal position, in the case where the hydraulic circuit of power jack 9, anchoring jack 10 and servocontrol-distributor 43 are all without pressure, which corresponds to the case of the helicopter on the ground. By-pass valve spring 148 of by-pass valve 141 pushes back by-pass valve 141 until its face 167 comes into abutment with the bottom of the housing of body 46. By-pass valve 141 then pushes lock piece 51 into recessed hole 55 on input lever 49, locking input lever 49 in its central position. As a result, actuator lever 50 is also locked in the central position, as is actuator valve 142, switching valve 143 and damper valve 144. Power jack upper chamber 60 and power jack lower chamber 61 are connected to the fluid reservoir return via drain channel 151 of by-pass valve 141, which leads into by-pass valve chamber 153 connected to by-pass return channel 175 and main hydraulic return channel 176 of the fluid reservoir return. The power jack is therefore in the by-pass configuration and is free to perform movements according to the position of the controls.

Anchoring jack chamber 72 is connected to power pack lower chamber 61 via anchoring jack hydraulic supply channel 76, which as a result connects this anchoring jack chamber 72 to the fluid reservoir return. Anchoring jack 10 is thus hydraulically disengaged but held in the anchoring position by anchoring jack spring 66. This spring 66 pushes back the two pistons 65 against respectively bearing face 69 and edge 70 of body 63.

The servocontrol is passive, the input lever 49 is locked, and power jack 9 being in the by-pass configuration is free to perform movements according to the position of the controls.

Figure 8:
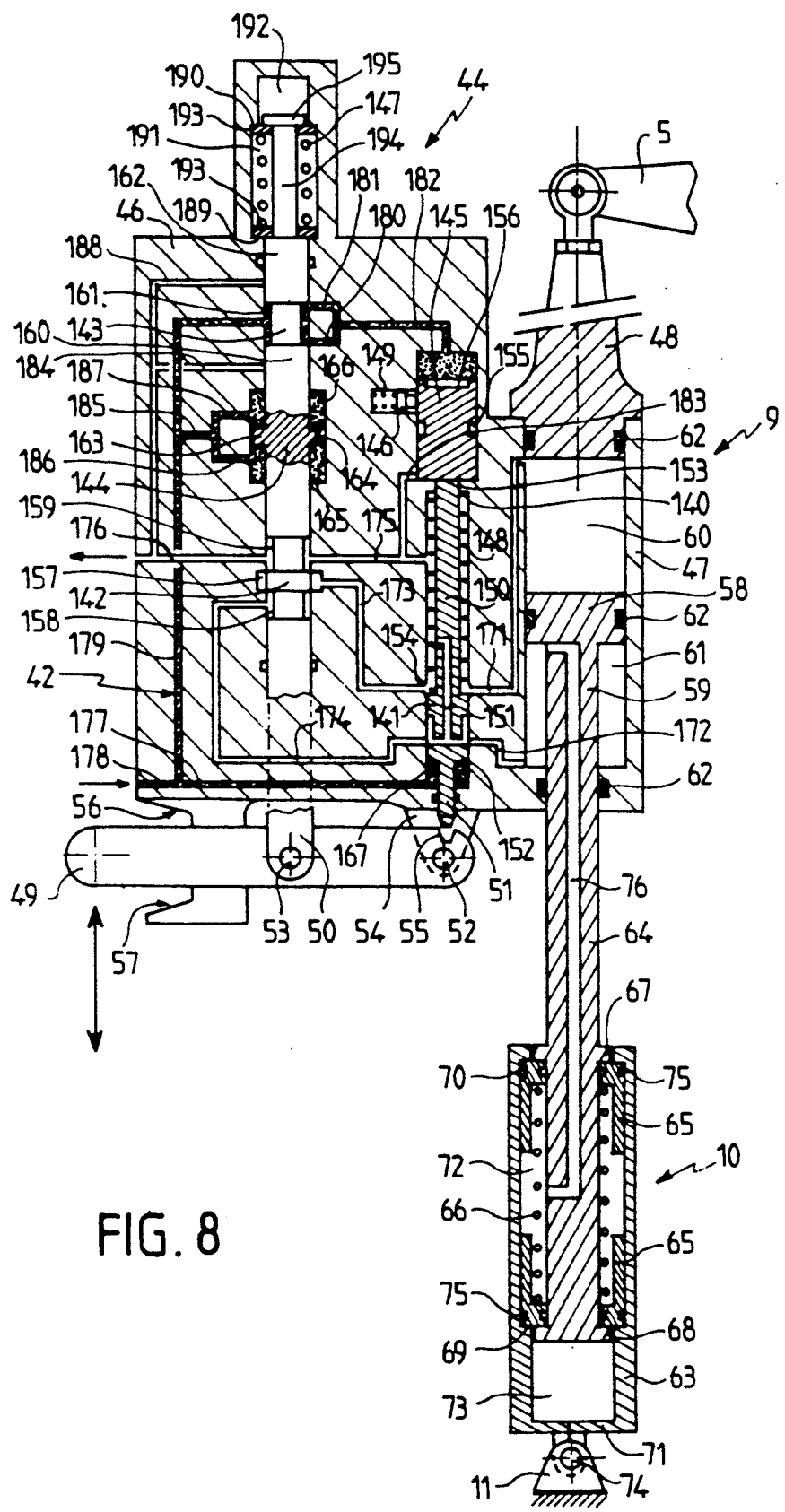
FIG. 8 is a similar view to that shown in FIG. 4 but with the hydraulic circuit under pressure and corresponds to the normally working disengaged position.

FIG. 8 shows the passive servocontrol in the normal position, in the case where the circuit is brought under pressure, which corresponds to the case of where the helicopter is in operation. The pressure arrives via first main hydraulic supply channel 178 and builds up in second main hydraulic supply channel 177. The pressure therefore pushes by-pass valve 141 back against switching piston 156. Supply channel 178 also pressurizes main switching supply channel 179 which supplies the switching circuit and also damper valve 144. Upper damper chamber 166 and lower damper chamber 165 of damper valve 144 are thus supplied via respectively damper upper supply channel 187 and damper lower supply channel 186 which are connected to main switching supply channel 179 via damper main supply channel 185. The switching circuit is supplied via the central chamber of switching valve 143, which is connected to main switching supply channel 179, and to switching control channel 182 which leads into end chamber 156 of switching piston 145, via two parallel switching supply channels 180 and 181, both of which lead into this central valve 161 of switching chamber 143. Switching piston 145 therefore comes up against the bottom of its housing, it then being possible for this witching piston 145 to serve as an end stop for by-pass valve 141, it being held in this position by the force of the pressure that exists in second main hydraulic supply channel 177, and which acts on face 167 and chamferred edge 152. When by-pass valve 141 moves, it clears lock piece 51 from recessed hole 55, thereby unlocking input lever 49, while leaving power jack upper chamber 60 and power jack lower chamber 61 connected to the fluid reservoir return, so that passive servocontrol-distributor 42 remains inoperative.

The passive servocontrol is inoperative and is driven in its movements by the cyclic plate. The transitory or permanent difference in position of the control linkage is absorbed by the input play, i.e. by the possible displacement of input lever 49. This displacement must in fact be sufficient in order that upper end stop 56 and lower end stop 57 are never reached.

Anchoring jack 10 is released but held in the medium position by anchoring jack spring 66 to ensure that displacement of the passive servocontrol is performed by the sliding of power jack 9, as if it was loop controlled. This removes the risk of anchoring jack 10 and servocontrol piston 58 of power jack 9 drifting towards an end stop.

Figure 9:
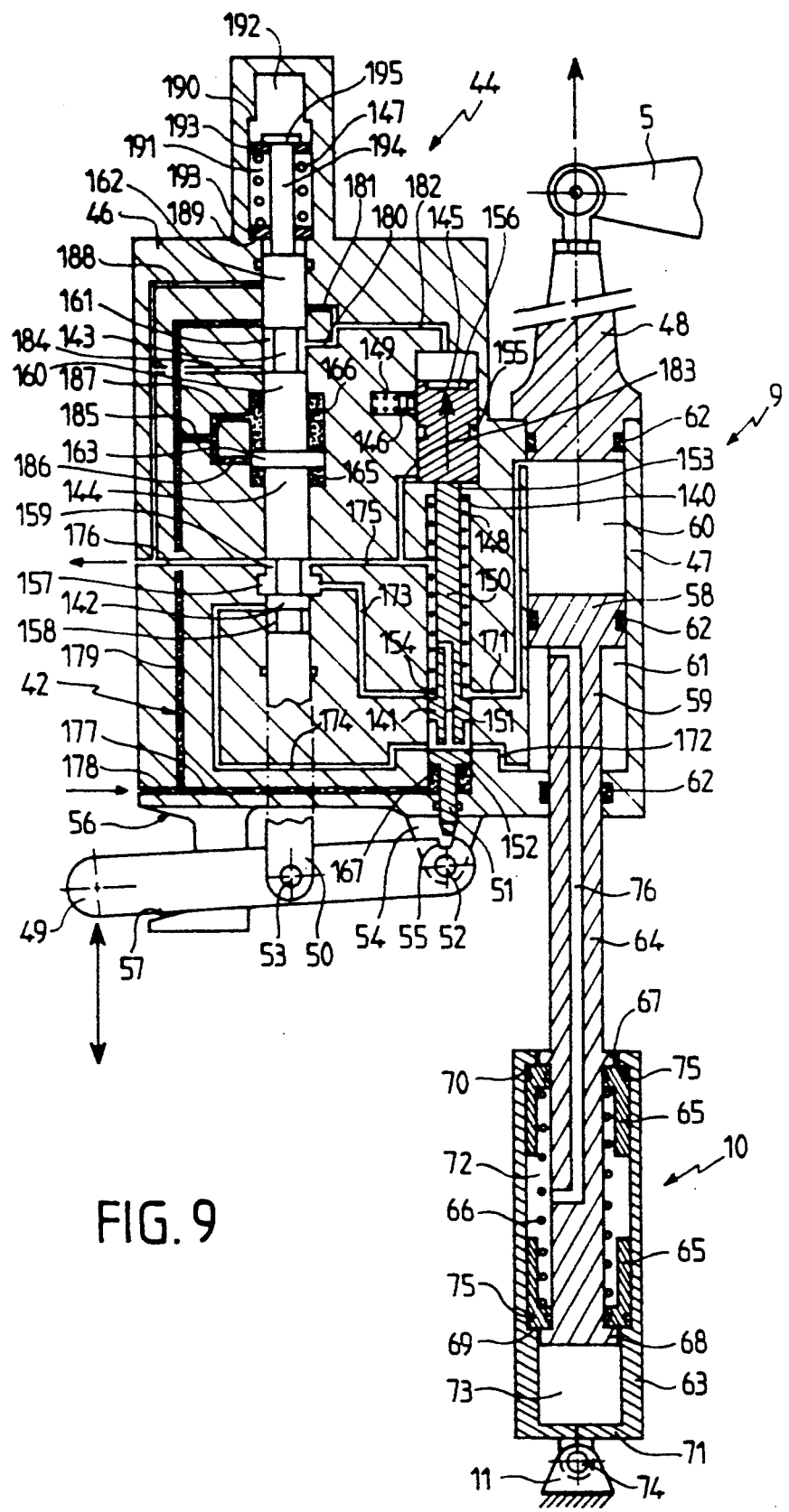
FIG. 9 is a view similar to the one shown in FIG. 4 but with the hydraulic circuit under pressure and the different elements in the engaging phase at the time of the failure.

FIG. 9 shows the passive servocontrol in the normal position with its hydraulic circuit under pressure, at the time when a failure caused by a shot has occurred on one of the three active servocontrols in the normal position. As already seen in relation to FIG. 7, this servocontrol is thus neutralized, and the circuit places itself in the position shown in this Figure. The non-rotating plate 5 is now only held by two active servocontrols, and exerts a force on the passive servocontrol. Input lever 49 of this passive servocontrol is held by the control linkage, and comes up against one of the end stops i.e. upper end stop 56 of lower end stop 57. When input lever 49 moves, it drives actuator lever 50, which moves upwards or downwards by a value greater than the permitted value. In performing this movement, actuator lever 50 also drives actuator valve 142, damper valve 144 of the damper, and switching valve 143. This movement connects the switching circuit to the fluid reservoir, since central chamber 161 of switching valve 143 becomes connected to the main hydraulic return channel 176 via second switching drain channel 188 which is connected to central chamber 161 via first switching drain channel 184. Central chamber 161 of switching valve 143 is in fact connected by switching supply channel 180 or switching supply channel 181 to end chamber 156 of switching piston 145 via switching control channel 182. In the case of FIG. 9, actuator lever 50 moves downwards, and switching supply channel 180 is connected to first switching drain channel 184 and main hydraulic return channel 176. When actuator lever 50 moved, it also disconnected the switching supply channel 182 from first main hydraulic supply channel 178 which is blocked by the land 189 of actuator lever 50. Since the switching circuit is connected tot he fluid reservoir, by-pass valve 141 is able to move as a result of the pressure from second main hydraulic supply channel 177 which acts on face 167 of this by-pass valve 141, and which then pushes back switching piston 145 in the direction of the arrow in FIG. 9, to allow by-pass valve 141 to close.

Figure 10:
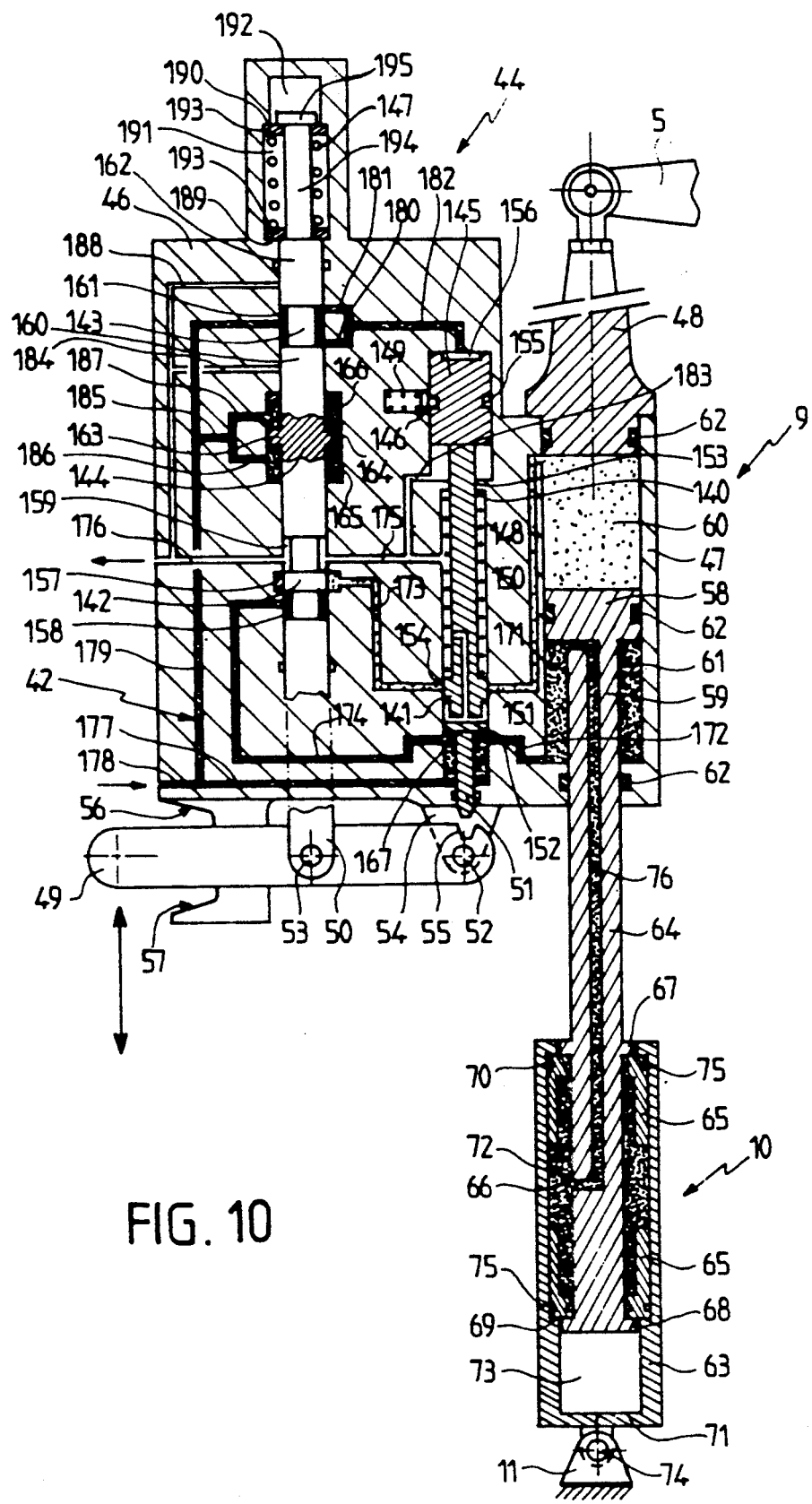
FIG. 10 is a similar view to the one shown in FIG. 4 but with the hydraulic circuit under pressure and the different elements engaged after the failure.

FIG. 10 is similar to FIG. 9, and shows the passive servocontrol in the normal position, by-pass valve 141 having completed its stroke and having pushed switching piston 145 up against the bottom of its housing in casing 46. This movement of by-pass valve 141 therefore connects first main hydraulic supply channel 178 to the control loop circuit of power jack 9, i.e. it connects first main hydraulic supply channel 178 to by-pass drain channel 151 and fourth 174 via the main hydraulic supply channel 177. By-pass drain channel 151 is connected to power jack lower chamber 61, and fourth channel 174 to lower actuator chamber 158 of actuator valve 142. The movement of by-pass valve 141 also broke the connection between the fluid reservoir and second channel 173 and first channel 171 of the control loop circuit in correspondence with power jack upper chamber 60.

Supply pressure in first main hydraulic supply channel 178 via second main hydraulic supply channel 177 also supplies, via drain channel 151 and power jack lower chamber 61, chamber 72 of anchoring jack 10 via anchoring jack supply channel 76.

As can be seen in the FIG. 10, when switching piston 145 moves upwards and comes into contact with the end stop in the bottom of its housing in body 46, switching piston lock 146 is able to engage in slot 155 on switching piston 145 by the action of its spring 149 in such a way that this witching piston 145 remains in the safeguard position.

Thus, when a failure occurs on one of the three normally working active servocontrols, actuator lever 50 of the passive servocontrol moves upwards or downwards by a value exceeding the permitted value, and connects central switching control chamber 161 of the switching valve 143 to one of first and second switching drain channels 184 and 188 which are connected to the fluid reservoir return. Switching piston 145 is then able to move under the action of by-pass valve 141 which is pushed by the pressure into the back-up position. Consequently, by-pass valve 141, connects power jack lower chamber 61 to lower actuator chamber 158 of actuator valve 142 via third and fourth channels 172 and 174, which are thus connected to first main hydraulic supply channel 178. In addition, by-pass valve 141 disconnects the fluid reservoir return from power jack upper chamber 60, the normally working passive servocontrol then becoming operations.

The servocontrol is then active and held in this position by the fact that the switching piston is locked by switching piston lock 146, which ensures the closing of the by-pass and makes it possible to supply the control loop circuit of power jack 9, and also supply anchoring jack 10.

The low-vulnerability system, in accordance with the invention, thus makes it possible to maintain normal flight control following a failure due to a missile hit on one of the active servocontrols, and odes this without calling for any intervention of the part of the pilot. Moreover, the device of the invention also makes it possible to ensure normal flight control in the event of other possible causes as described below.

The blocking of fluid to and from jack 9 on the passive servocontrol does not hinder normal control since anchoring jack 10 is disengaged.

The blocking of fluid to and from an anchoring jack 10 in the absence of hydraulic leakage form any of the three normally working active servocontrol control systems will not affect the overall working of the system.

In the even of hydraulic leakage for whatever reason on one of the three normally working active servocontrols, this servocontrol is then neutralized, and the normally working passive servocontrol moves to the safeguard position, as previously described. In the event of hydraulic leakage for whatever reason on the passive servocontrol, control of the aircraft will not be affected, the pilot simply being informed of the pressure loss.

If input lever 49 or control linkage 13 on one of the active servocontrols is broken, compression return spring 87 located at the end of actuator lever 50 pushes back lever 50 and causes switching to occur in such a way that this servocontrol is neutralized, the passive servocontrol then assuming the safeguard position as previously described. If input lever 49 or control linkage 13 on the passive servocontrol is broken actuator lever 50 will remain in the medium position because of the action of lock piece 51 pushed by spring 148, the servocontrol remaining disengaged.

If one of the three normally working active servocontrols or its corresponding anchoring breaks the servocontrol becomes inoperative, the passive servocontrol then assuming the safeguard position as described previously. If the passive servocontrol or its anchoring break the control of the aircraft will not be affected.

What is claimed is that:

1. Low-vulnerability device for the operation of plural lifting and propulsing rotor blades of a helicopter controlled by control linkages from a cockpit, the linkages being connected to a cyclic plate mechanism mounted coaxially on a rotor drive shaft, the cyclic plate mechanism including a rotating plate coupled by a peripheral part individually to a plurality of rods, each rod controlling the pitch of one rotor blade, and a non-rotating plate coupled at four points regularly distributed around a periphery of the non-rotating plate to four hydraulic actuating servocontrols, each servocontrol comprising a power jack, an anchoring system and a servocontrol-distributor, three of the servocontrols being used in normal working and the fourth being used as back-up in the event of a failure occurring on one of the other three normally working servocontrols wherein:

each power jack is supplied by a hydraulic circuit, independent of the hydraulic circuits of the other jacks, each hydraulic circuit including a hydraulic supply, a fluid reservoir and a hydraulic return to said fluid reservoir, and each power jack is attached to the servocontrol-distributor which is operated by a mechanical input which is linked to the cockpit by the corresponding control linkage;

each power jack being operatively connected to one of the anchoring systems, each anchoring system being disengagable;

each of the servocontrol-distributors of the normally working servocontrols is structurally arranged so as to be active in normal working and to block the anchoring system of each corresponding power jack, and the one servocontrol-distributor of the back-up servocontrol is structurally arranged so as to be passive in normal working and to keep the anchoring system of the corresponding power jack disengaged;

each mechanical input of the four servocontrol-distributors comprises a system which in the event of a certain force threshold being exceeded on one of the three normally active servocontrol-distributors, neutralizes this one servocontrol-distributor and initiates starting up of the normally passive servocontrol-distributor which then becomes operational in a safeguard working mode.

2. Device as claimed in claim 1 wherein each servocontrol-distributor is incorporated in the corresponding power jack so as to form a monoblock assembly formed of a body of the servocontrol-distributor and a body of the power jack.

3. Device as claimed in claim 2 wherein each servocontrol-distributor comprises:

a distribution assembly with a control loop between the position of the body of the power jack and the position of the corresponding mechanical input; and a system for switching said control loop so as to place said loop in an opposite state to that corresponding to normal working of the servocontrol-distributor.

4. Device as claimed in claim 3 wherein each mechanical input is mounted on the corresponding monoblock assembly and wherein the control loop of each servocontrol-distributor includes means for receiving feedback information concerning the position of the body of the power jack and for acting directly on the position of the mechanical input mounted on the monoblock assembly by a control system linked to the mechanical input, in such a way so that any change in the position of the mechanical input in relation to the monoblock assembly in response to a pilot maneuver causes displacement of the monoblock assembly until the mechanical input returns to an initial relative position in relation to said monoblock assembly.

5. Device as claimed in claim 4 wherein said control loop of each servocontrol-distributor is linked to supply pressure of the corresponding independent hydraulic circuit, and the control system of each servocontrol-distributor is connected to the fluid reservoir of the corresponding independent hydraulic circuit.

6. Device as claimed in claim 4, wherein the control system of each servocontrol-distributor comprises an actuator valve linked to the mechanical input.

7. Device as claimed in claim 3 wherein each power jack has a differential section, and comprises a power jack piston with a power jack rod linked to the anchoring system, a power jack upper chamber and a power jack lower chamber being defined by said power jack piston, the power jack rod extending through said power jack lower chamber, said power jack upper chamber and said power jack lower chamber being connected to the corresponding control loop, in such a way that when the power jack operates, the power jack lower chamber is always connected to the corresponding pressurized hydraulic circuit.

8. Device as claimed in claim 7 wherein the system for switching the control loop comprises:

a by-pass valve of the power jack mounted in the control loop;

a two-position switching piston; and a switching distributor which acts on the switching piston to provide two positions which are an initial position in which the switching piston works with the by-pass valve to obtain normal working of the servocontrol-distributor of the corresponding power jack; and a back-up position in which the switching piston works with the by-pass valve to obtain safeguard working of the servocontrol-distributor of the corresponding power jack.

9. Device as claimed in claim 8 wherein the by-pass valve is mounted on a main hydraulic supply channel of the control loop, and is connected to the fluid reservoir in such a way that this by-pass valve has at least two positions with:

one position corresponding to the control loop without pressure, and another position corresponding to the control loop under pressure.

10. Device as claimed in claim 8 wherein the switching piston is locked in the back-up position by a switching piston lock.

11. Device as claimed in claim 8 wherein the mechanical input has a lock.

12. Device as claimed in claim 11 wherein the lock includes a lock piece carried by the by-pass valve which lock piece is engageable in a recessed hole on the mechanical input.

13. Device as claimed in claim 8 wherein an actuator valve and the switching distributor are both formed on an actuator lever linked at one end to the mechanical input which is made up of an input lever.

14. Device as claimed in claim 13 wherein the actuator lever comprises an elastic return system at the other end opposite to said one end.

15. Device as claimed in claim 14 wherein the elastic return system comprises a compression spring mounted between the body of the servocontrol-distributor and said other end of the actuator lever.

16. Device as claimed in claim 14 wherein the actuator lever includes a return rod at said other end, the elastic return system comprises a compression spring mounted on said return rod between two washers arranged at each of the ends of said return rod and held in position by a collar, one washer pressing against a first bearing face on the body of the servocontrol-distributor, and one washer pressing against a second bearing face on the body of the servocontrol-distributor opposite said first bearing face.

17. Device as claimed in claim 13 wherein the input lever is mounted under the body of the servocontrol-distributor by a first articulation located at one of its ends, the other end receiving input movement via the corresponding control linkage, the actuator lever being linked to the input lever by a second articulation located between the movement input position and the first articulation.

18. Device as claimed in claim 17 wherein the input lever works with two end stops: one upper end stop and one lower end stop which are formed integral with the body of the servocontrol-distributor.

19. Device as claimed in claim 17 wherein the input lever has a recessed hole made in an upper side thereof, and a lock piece is carried by the by-pass valve and is receivable in said recessed hole which locks the input lever.

20. Device as claimed in claim 19 wherein said recessed hole and said lock piece have conjugate shapes in the form of a substantially truncated cone.

21. Device as claimed in claim 17 wherein the first articulation of the input lever is supported by two lugs made under the body of the servocontrol-distributor.

22. Device as claimed in claim 13 wherein the actuator lever further comprises a damper.

23. Device as claimed in claim 21 wherein the three active servocontrol-distributors when normally working each comprise:

the actuator valve mounted on the actuator lever and surrounded by an annular actuator chamber with a lower actuator chamber and an upper actuator chamber located on each side of the actuator valve;

the by-pass valve having on one end a by-pass valve rod on which is mounted a by-pass valve spring which presses against the by-pass valve, the by-pass valve being arranged in a by-pass valve chamber, the other end of the by-pass valve having a chamferred edge which, under the action of the by-pass valve spring, comes into contact with the body of the servocontrol-distributor, an annular flow chamber being arranged around the by-pass valve and which has a by-pass drain channel leading into the by-pass valve chamber;

the control loop having a first channel which connects the power jack upper chamber to the annular flow chamber of the by-pass valve, which is in turn connected by a second channel to the annular actuator chamber and a third channel connecting the power jack lower chamber to the by-pass valve which is connected by a fourth channel to the lower actuator chamber of the actuator valve;

a first main hydraulic supply channel connected to the hydraulic supply of the corresponding hydraulic circuit and to a second main hydraulic supply channel which leads to the by-pass valve;

a main hydraulic return channel connected to the corresponding fluid reservoir and leading to the upper actuator chamber of the actuator valve, said upper actuator chamber linked by a by-pass return channel to the by-pass valve chamber of the by-pass valve;

in such a way that when the corresponding hydraulic circuit is under pressure, the by-pass valve moves as a result of the pressure in the first main hydraulic supply channel to connect the power jack lower chamber to the lower actuator chamber via the first and second channels, which are thus connected to the first and second main hydraulic supply channels, and wherein, in response to movement of the actuator lever, the actuator valve moves so as to connect the power jack upper chamber to either the lower actuator chamber or to the upper actuator chamber depending on the direction of movement of the lever, causing the body of the jack to move until the actuator valve returns to a balancing position.

24. Device as claimed in claim 23 wherein the three active servocontrol-distributors when normally working each further comprise:

said switching distributor comprising a switching valve mounted on the actuator lever with a lower switching chamber and an upper switching chamber located on each side of the switching valve;

said switching piston being mounted int he body of the servocontrol-distributor and in a continuation of the by-pass valve chamber, in such a way that the by-pass valve spring bears against said switching piston;

a switching control channel connecting a face of the switching piston to the lower switching chamber via a first switching supply channel, and to the upper switching chamber via a second switching supply channel, a main switching supply channel connecting the switching valve to the first main hydraulic supply channel;

in such a way that when the actuator lever moves upwards or downwards by a value greater than a permitted value, the actuator lever connects one of the upper and lower switching chambers to the main switching supply channel under pressure, the pressure then being sent via the switching control channel to act on the switching piston which moves to said back-up position and pushes back the by-pass valve which then connects the power jack lower and upper chambers to the by-pass return and main hydraulic return channels to the corresponding fluid reservoir via the third and fourth channels which lead into the by-pass drain channel connected to the by-pass valve chamber, and via the first and second channels in which the annular flow chamber is thus connected to the by-pass valve chamber.

25. Device as claimed in claim 24 wherein said face of the switching piston comprises a bevelled shoulder forming with said body of the servocontrol-distributor an end chamber.

26. Device as claimed in claim 24 wherein a switching piston lock is mounted perpendicular to a longitudinal axis of the switching piston, the switching piston lock being pushed by a switching piston lock spring in such a way as to engage in a slot made in the switching piston.

27. Device as claimed in claim 24 wherein the three active servocontrol-distributors when normally working each further comprise a damper valve mounted on the actuator lever with a damper collar separating a lower damper chamber from an upper damper chamber, said lower and upper damper chambers being connected to the first main hydraulic supply channel via a damper main supply channel connected to the lower damper chamber via a damper lower supply channel and to the upper damper chamber via a damper upper supply channel, the damper collar having at least one throttling passage linking the upper and lower damper chambers.

28. Device as claimed in claim 24 wherein the three active servocontrol-distributors each comprise a link channel between the by-pass hydraulic return channel and the switching control channel, said link channel including a throttling passage.

29. Device as claimed in claim 21 wherein the passive back up servocontrol-distributor when normally working comprises:
the actuator valve mounted on the actuator lever and surrounded by an annular actuator chamber, with a lower actuator chamber and an upper actuator chamber located on each side of the actuator valve;
the by-pass valve having on one end a by-pass valve rod on which a by-pass valve spring is mounted which presses against the by-pass valve and against the body of the servocontrol-distributor, the by-pass valve being arranged in a by-pass valve chamber, the other end of the by-pass valve having a chamferred edge which, under the action of the by-pass valve spring, comes into contact with the body of the servocontrol-distributor, an annular flow chamber being arranged around the by-pass valve which has a by-pass drain channel leading into the by-pass valve chamber;
the control loop having:
a first channel which connects the power jack upper chamber to the annular flow chamber of the by-pass valve which is in turn connected by a second channel to the annular actuator chamber of the actuator valve;
and a third channel connecting the power jack lower chamber to the by-pass valve, which is connected by a fourth channel to the lower actuator chamber of the actuator valve;
a first main hydraulic supply channel connected to the hydraulic supply of the corresponding hydraulic circuit and to a second main hydraulic supply channel which leads to the by-pass valve;
a main hydraulic return channel connected to the corresponding fluid reservoir and leading to the upper actuator chamber which is connected via a by-pass return channel to the by-pass valve chamber;
in such a way that when the corresponding hydraulic circuit is under pressure, the by-pass valve is moved by the pressure in the second main hydraulic supply channel while at the same time leaving the power jack upper chamber and power jack lower chamber connected to the main hydraulic return channel to the fluid reservoir, so that the passive back-up servocontrol-distributor remains inoperative.

30. Device as claimed in claim 29 wherein the passive back-up servocontrol-distributor when normally working further comprises:
said switching distributor comprising a switching valve mounted on the actuator lever with a central chamber and a lower switching land and an upper switching land located one on each side of said central chamber;
said switching piston being mounted in the body of the servocontrol-distributor and in a continuation of the by-pass valve chamber;
a switching control channel connecting a face of the switching piston via two switching supply channels to the central chamber of the switching valve which is connected by a main switching supply channel to the first main hydraulic supply channel, hydraulic pressure from at least one of the two switching supply channels acting on the switching piston, to hold said switching piston in an initial lower position, a first switching drain channel being connected to the main hydraulic return channel connected to the hydraulic return to the fluid reservoir leading to the lower switching land and a second switching drain channel connected to the first switching drain channel leading to the upper switching land;
in such a way that when the actuator lever moves upwards or downwards by a value that exceeds a permitted value, the switching valve connects the central chamber to one of the first and second switching drain channels connected to the hydraulic return to the fluid reservoir, the switching piston then being able to move under the action of the by-pass valve pushed by the hydraulic pressure to assume the back-up position, the by-pass valve thus connecting the power jack lower chamber and the lower actuator chamber of the actuator valve via the third and fourth channels which are thus connected tot he first main hydraulic supply channel, and the by-pass valve cuts the link between the hydraulic return to the fluid reservoir and the power jack upper chamber, and the by-pass servocontrol-distributor becomes operation.

31. Device as claimed in claim 30 wherein the face of the switching piston comprises a bevelled shoulder forming with said body of the servocontrol-distributor and end chamber.

32. Device as claimed in claim 30 wherein a switching piston lock is mounted perpendicular to a longitudinal axis of the switching piston, the switching piston lock being pushed by a switching piston lock spring in such a way as to engage in a slot made int eh switching piston.

33. Device as claimed in claim 30 wherein the passive back-up servocontrol-distributor when normally working further comprises a damper valve mounted on the actuator lever with a damper collar separating a lower damper chamber from an upper damper chamber, said upper and lower damper chambers being connected to the first main hydraulic supply channel via a damper main supply channel connected to the lower damper chamber via a damper lower supply channel and to the upper damper chamber via a damper upper supply channel, the damper collar having at least one throttling passage linking the upper and lower damper chambers.

34. Device as claimed in claim 7 wherein each anchoring system comprises an anchoring jack with a linking means to the corresponding power jack and having an anchoring jack hydraulic circuit connected to the power jack lower chamber, and means for coupling the anchoring jack to a structural element of the helicopter.

35. Device as claimed in claim 34 wherein the anchoring jack comprises an anchoring jack body with a anchoring jack rod carrying two anchoring jack chamber pistons which slide in the anchoring jack body and which, together with the anchoring jack rod and the anchoring jack body, determine an anchoring jack chamber.

36. Device as claimed in claim 35 wherein the power jack rod and the anchoring jack rod are a single and same part constituting the linking means.

37. Device as claimed in claim 36 wherein the anchoring jack hydraulic supply circuit includes an anchoring jack hydraulic supply channel made in the power jack rod and the anchoring jack rod, in such a way so as to directly link the anchoring jack chamber to the power jack lower chamber.

38. Device as claimed in claim 35 wherein the two anchoring jack pistons are held on the anchoring jack rod by a first collar and by a second collar formed as an end collar, both said first and second collars being formed on said anchoring jack rod, and an anchoring jack spring positioned on the anchoring jack rod pushing back both pistons away form one another to hold them in position with one piston pressing against a bearing face of the anchoring jack body and the other piston pressing against an edge of the anchoring jack body opposite said bearing face.

39. Device as claimed in claim 35 wherein the means for coupling comprise an anchoring articulation connected to the structural element of the helicopter and to a bottom of the anchoring jack body.

* * * * *